(12) United States Patent
Lohmann-Rademacher et al.

(10) Patent No.: US 11,566,152 B2
(45) Date of Patent: Jan. 31, 2023

(54) ADHESIVE STRIPS

(71) Applicant: TESA SE, Norderstedt (DE)

(72) Inventors: Franciska Lohmann-Rademacher, Hamburg (DE); Anika Petersen, Heidmühlen (DE); Axel Burmeister, Hamburg (DE); Mathias Hoser, Hamburg (DE)

(73) Assignee: TESA SE, Norderstedt (DE)

( * ) Notice: Subject to any disclaimer, the term of this patent is extended or adjusted under 35 U.S.C. 154(b) by 352 days.

(21) Appl. No.: 16/070,114

(22) PCT Filed: Feb. 16, 2017

(86) PCT No.: PCT/EP2017/053536
§ 371 (c)(1),
(2) Date: Jul. 13, 2018

(87) PCT Pub. No.: WO2017/140801
PCT Pub. Date: Aug. 24, 2017

(65) Prior Publication Data
US 2019/0016927 A1    Jan. 17, 2019

(30) Foreign Application Priority Data
Feb. 18, 2016  (DE) ................. 10 2016 202 479.5

(51) Int. Cl.
*C09J 7/38*      (2018.01)
*C09J 7/22*      (2018.01)
*C09J 133/08*    (2006.01)
*C09J 123/00*    (2006.01)
*C08K 5/01*      (2006.01)
(Continued)

(52) U.S. Cl.
CPC ............. *C09J 7/38* (2018.01); *C08K 5/0025* (2013.01); *C08K 5/01* (2013.01); *C08K 7/22* (2013.01);
(Continued)

(58) Field of Classification Search
None
See application file for complete search history.

(56) References Cited

U.S. PATENT DOCUMENTS

| 7,070,051 | B2 * | 7/2006 | Kanner ............ A61B 17/06133 206/382 |
| 2003/0012945 | A1 * | 1/2003 | Runge .................... C09J 7/255 428/317.1 |
| 2013/0081764 | A1 | 4/2013 | Yamanaka et al. |

FOREIGN PATENT DOCUMENTS

| CN | 103031076 A | 4/2013 |
| DE | 10129730 A1 | 1/2003 |

(Continued)

OTHER PUBLICATIONS

English translation of CN Office Action issued in corresponding CN application 201780012005.8 dated Mar. 11, 2019.
(Continued)

*Primary Examiner* — Frank D Ducheneaux
(74) *Attorney, Agent, or Firm* — Norris McLaughlin PA

(57) ABSTRACT

The invention relates to adhesive strips consisting of at least four, particularly precisely four layers, comprising: a layer A having an upper side and a lower side consisting of a foamed adhesive substance containing a self-adhesive acrylate substance; a layer B consisting of a film carrier, layer B being arranged on the lower side of layer A, at least the main surface which faces layer A, preferably both main surfaces of the film carrier, being etched, the surface of layer A and the surface of layer B being in direct contact with each other; a layer C consisting of a self-adhesive substance, arranged on the upper side of layer A and containing a self-adhesive acrylate substance; and a layer D consisting of a self-adhesive substance, arranged on the side of layer B opposite layer A and containing a self-adhesive acrylate substance.

18 Claims, 11 Drawing Sheets

(51) Int. Cl.
  *C08K 7/22* (2006.01)
  *C09J 133/10* (2006.01)
  *C08K 5/00* (2006.01)

(52) U.S. Cl.
  CPC ............ *C09J 7/22* (2018.01); *C09J 7/383* (2018.01); *C09J 7/385* (2018.01); *C09J 123/00* (2013.01); *C09J 133/08* (2013.01); *C09J 133/10* (2013.01); *C09J 2203/326* (2013.01); *C09J 2301/1242* (2020.08); *C09J 2301/208* (2020.08); *C09J 2301/302* (2020.08); *C09J 2301/312* (2020.08); *C09J 2301/408* (2020.08); *C09J 2301/412* (2020.08); *C09J 2400/24* (2013.01); *C09J 2433/00* (2013.01)

(56) References Cited

FOREIGN PATENT DOCUMENTS

| | | |
|---|---|---|
| DE | 102008004388 A1 | 7/2009 |
| EP | 2463332 A2 | 6/2012 |
| EP | 2578654 A1 | 4/2013 |
| JP | 2012007130 A | 1/2012 |
| KR | 20130036717 A | 4/2013 |
| KR | 20140033081 A | 3/2014 |

OTHER PUBLICATIONS

English Translation of TW Office Action for corresponding application TW 106105082 dated Jul. 23, 2018.
KR Office Action for corresponding application KR 10-2018-7026929 dated Feb. 27, 2019, with English translation.
German Search Report for corresponding application DE 10 2016 202 479.5 dated Nov. 9, 2016.
International Search Report and Written Opinion of the International Searching Authority for corresponding application PCT/EP2017/053536 dated May 16, 2017.
English translation of the International Search Report for corresponding application PCT/EP2017/053536 dated May 16, 2017.
English translation of JP Office Action issued in corresponding JP application 2018-543682 dated Aug. 7, 2019.

* cited by examiner

| Test | Example 2 300 μm | Example 3 150 μm | Comparative example 1 300 μm | Comparative example 2 300 μm | Comparative example 3 300 μm | Comparative example 4 300 μm |
|---|---|---|---|---|---|---|
| P.A initial steel (foam side) | 17.0 | 16.8 | 17.2 | 16.6 | 17.0 | 16.6 |
| P.A initial steel (PET side) | 10.6 | 10.1 | 10.8 | 10.3 | 10.4 | 10.1 |
| P.A initial PC (foam side) | 16.5 | 7.2 | 16.3 | 15.8 | 16.6 | 16.0 |
| P.A initial PC (PET side) | 11.7 | 4.1 | 11.4 | 10.7 | 11.2 | 11.3 |
| P.A 3d steel (foam side) | 18.4 | n.m | 18.0 | n.m | 18.5 | n.m |
| P.A 3d steel (PET side) | 11.9 | n.m | 11.7 | n.m | 12.0 | n.m |
| P.A 3d PC (foam side) | 24.4 | 19.1 | 24.2 | 24.7 | 24.0 | 24.1 |
| P.A 3d PC (PET side) | 14.2 | 12.4 | 14.4 | 14.0 | 13.8 | 13.9 |
| T-peel [N/cm] | 16.0 | 14.8 | n.m | n.m | n.m | n.m |
| Push-out [N] | 155 | 171 | 148 | 140 | 140 | 143 |
| Ball drop [cm] | 145 | 145 | 45 | 52 | 43 | 49 |
| Impact resistance z direction [J] | 0.68 | 0.49 | 0.5 | 0.35 | 0.35 | 0.38 |
| Transverse impact resistance; x,y plane [J] | 0.96 | n.m | 0.8 | 0.73 | 0.63 | 0.59 |

Fig. 2

| Test | Example 2 300 µm | Example 3 150 µm | Comparative example 5 300 µm | Comparative example 6 300 µm | Comparative example 7 300 µm |
|---|---|---|---|---|---|
| P.A initial steel (foam side) | 17.0 | 16.8 | 17.5 | 16.3 | 17.1 |
| P.A initial steel (PET side) | 10.6 | 10.1 | 10.2 | 9.9 | 10.3 |
| P.A initial PC (foam side) | 16.5 | 7.2 | 16.1 | 17.0 | 16.5 |
| P.A initial PC (PET side) | 11.7 | 4.1 | 11.6 | 11.2 | 12.0 |
| P.A 3d steel (foam side) | 18.4 | n.m | 18.0 | n.m | 18.3 |
| P.A 3d steel (PET side) | 11.9 | n.m | 11.8 | n.m | 11.9 |
| P.A 3d PC (foam side) | 24.4 | 19.1 | 24.3 | 24.1 | 25.1 |
| P.A 3d PC (PET side) | 14.2 | 12.4 | 14.8 | 13.7 | 12.6 |
| T-peel [N/cm] | 16.0 | 14.8 | n.m | n.m | n.m |
| Push-out [N] | 155 | 171 | 136 | 141 | 149 |
| Ball drop [cm] | 145 | 145 | 96 | 98 | 80 |
| Impact resistance z direction [J] | 0.62 | 0.49 | 0.50 | 0.50 | 0.45 |
| Transverse impact resistance; x,y plane [J] | 0.96 | n.m | 0.80 | 0.72 | 0.72 |

Fig. 2 continued

ADHESIVE STRIPS

This is an application filed under 35 USC 371 based on PCT/EP2017/053536, filed 16 Feb. 2017, which in turn is based on DE 10 2016 202 479.5 filed 18 Feb. 2016. The present application claims the full priority benefit of these prior applications and herein incorporates by reference the full disclosures of these prior applications.

The invention relates to a pressure-sensitive adhesive strip.

Adhesive tapes are frequently used for the bonding of ultrasmall components, for example in devices in the consumer electronics industry. In order to enable this, it is necessary for the form of the adhesive tape section to be matched to the form of the component. In this case, difficult geometries are often also necessary, which are obtained by die-cutting of the adhesive tape. Thus, element widths in die-cut parts of a few millimeters are by no means rare. On application of these sensitive adhesive tapes to the components, there is frequently deformation of the die-cut parts.

In order to suppress or at least reduce the deformation, it has been found to be advantageous to integrate a film, for example a PET film, into the adhesive tapes as a middle lamina in order to absorb the tensile forces on application.

Bonds with such adhesive tapes are increasingly also being used if the component is subject to shocks. Particularly shock-resistant bonds have been found to be those with pressure-sensitive adhesive strips having a viscoelastic, syntactically foamed core, a stabilizing film and, on the outer laminas, two self-adhesive bonding layers.

These pressure-sensitive adhesive strips are capable of such high performance that cohesive fracture within the pressure-sensitive adhesive strip is to be observed under shock. The bond between the foamed core and the stabilizing film fails, and foam and film are parted from one another.

Foamed pressure-sensitive adhesive composition systems have long been known and are described in the prior art.

In principle, polymer foams can be produced in two ways. One way is via the effect of a blowing gas, whether added as such or resulting from a chemical reaction, and a second way is via incorporation of hollow beads into the material matrix. Foams that have been produced by the latter route are referred to as syntactic foams.

In the case of a syntactic foam, hollow beads such as glass beads or hollow ceramic beads (microbeads) or microballoons are incorporated in a polymer matrix. As a result, in a syntactic foam, the voids are separated from one another and the substances (gas, air) present in the voids are divided from the surrounding matrix by a membrane.

Compositions foamed with hollow microbeads are notable for a defined cell structure with a homogeneous size distribution of the foam cells. With hollow microbeads, closed-cell foams without voids are obtained, the features of which include better sealing action against dust and liquid media compared to open-cell variants. Furthermore, chemically or physically foamed materials have a greater propensity to irreversible collapse under pressure and temperature, and frequently show lower cohesive strength.

Particularly advantageous properties can be achieved when the microbeads used for foaming are expandable microbeads (also referred to as "microballoons"). By virtue of their flexible, thermoplastic polymer shell, foams of this kind have higher adaptation capacity than those filled with non-expandable, non-polymeric hollow microbeads (for example hollow glass beads). They have better suitability for compensation for manufacturing tolerances, as is the rule, for example, in the case of injection-molded parts, and can also better compensate for thermal stresses because of their foam character.

Furthermore, it is possible to further influence the mechanical properties of the foam via the selection of the thermoplastic resin of the polymer shell. For example, even when the foam has a lower density than the matrix, it is possible to produce foams having higher cohesive strength than with the polymer matrix alone. For instance, typical foam properties such as adaptation capacity to rough substrates can be combined with a high cohesive strength for self-adhesive foams.

Among the devices in the consumer electronics industry are electronic, optical and precision devices, in the context of this application especially those devices as classified in Class 9 of the International Classification of Goods and Services for the Registration of Marks (Nice classification); 10th edition (NCL(10-2013)), to the extent that these are electronic, optical or precision devices, and also clocks and time-measuring devices according to Class 14 (NCL(10-2013)), such as, in particular, scientific, marine, surveying, photographic, film, optical, weighing, measuring, signalling, monitoring, rescuing, and instruction apparatus and instruments;

apparatus and instruments for conducting, switching, converting, storing, regulating and monitoring electricity;

image recording, processing, transmission, and reproduction devices, such as televisions and the like;

acoustic recording, processing, transmission, and reproduction devices, such as broadcasting devices and the like;

computers, calculating instruments and data-processing devices, mathematical devices and instruments, computer accessories, office instruments—for example, printers, faxes, copiers, typewriters, data-storage devices;

telecommunications devices and multifunction devices with a telecommunications function, such as telephones and answering machines;

chemical and physical measuring devices, control devices, and instruments, such as battery chargers, multimeters, lamps, and tachometers;

nautical devices and instruments;

optical devices and instruments;

medical devices and instruments and those for sportspeople;

clocks and chronometers;

solar cell modules, such as electrochemical dye solar cells, organic solar cells, and thin-film cells;

fire-extinguishing equipment.

Technical development is going increasingly in the direction of devices which are ever smaller and lighter in design, allowing them to be carried at all times by their owner, and usually being generally carried. This is accomplished increasingly nowadays by realization of low weights and/or suitable size of such devices. Such devices are also referred to as mobile devices or portable devices for the purposes of this specification. In this development trend, precision and optical devices are increasingly being provided (also) with electronic components, thereby raising the possibilities for minimization. On account of the carrying of the mobile devices, they are subject to increased loads—in particular, to mechanical loads—as for instance by impact on edges, by being dropped, by contact with other hard objects in a bag, or else simply by the permanent motion involved in being carried per se. Mobile devices, however, are also subject to a greater extent to loads due to moisture exposure, temperature influences, and the like, than those "immobile" devices which are usually installed in interiors and which move little or not at all.

The invention accordingly refers with particular preference to mobile devices, since the pressure-sensitive adhesive strip used in accordance with the invention has a particular benefit here on account of their unexpectedly good properties (very high shock resistance). Listed below are a number of portable devices, without wishing the representatives specifically identified in this list to impose any unnecessary restriction with regard to the subject matter of the invention.

cameras, digital cameras, photography accessories (such as light meters, flashguns, diaphragms, camera casings, lenses, etc.), film cameras, video cameras
  small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems,
  computer accessories and operating units for electronic devices, such as mice, drawing pads, graphics tablets, microphones, loudspeakers, games consoles, gamepads, remote controls, remote operating devices, touchpads
  monitors, displays, screens, touch-sensitive screens (sensor screens, touchscreen devices), projectors
  reading devices for electronic books ("E-books")
  mini TVs, pocket TVs, devices for playing films, video players
  radios (including mini and pocket radios), Walkmans, Discmans, music players for e.g. CDs, DVDs, Blu-ray, cassettes, USB, MP3, headphones
  cordless telephones, cellphones, smartphones, two-way radios, hands-free telephones, devices for summoning people (pagers, bleepers)
  mobile defibrillators, blood sugar meters, blood pressure monitors, step counters, pulse meters
  torches, laser pointers
  mobile detectors, optical magnifiers, binoculars, night vision devices
  GPS devices, navigation devices, portable interface devices for satellite communications
  data storage devices (USB sticks, external hard drives, memory cards)
  wristwatches, digital watches, pocket watches, chain watches, stopwatches.

For these devices, a particular requirement is for adhesive tapes having high holding performance.

In addition, it is important that the holding performance of the adhesive tapes does not fail when the electronic device, for example a cellphone, is dropped and hits the ground. The adhesive strip must thus have very high shock resistance.

FIG. 2 is a tabular listing of bonding force test results of several films.

Figure 3A:
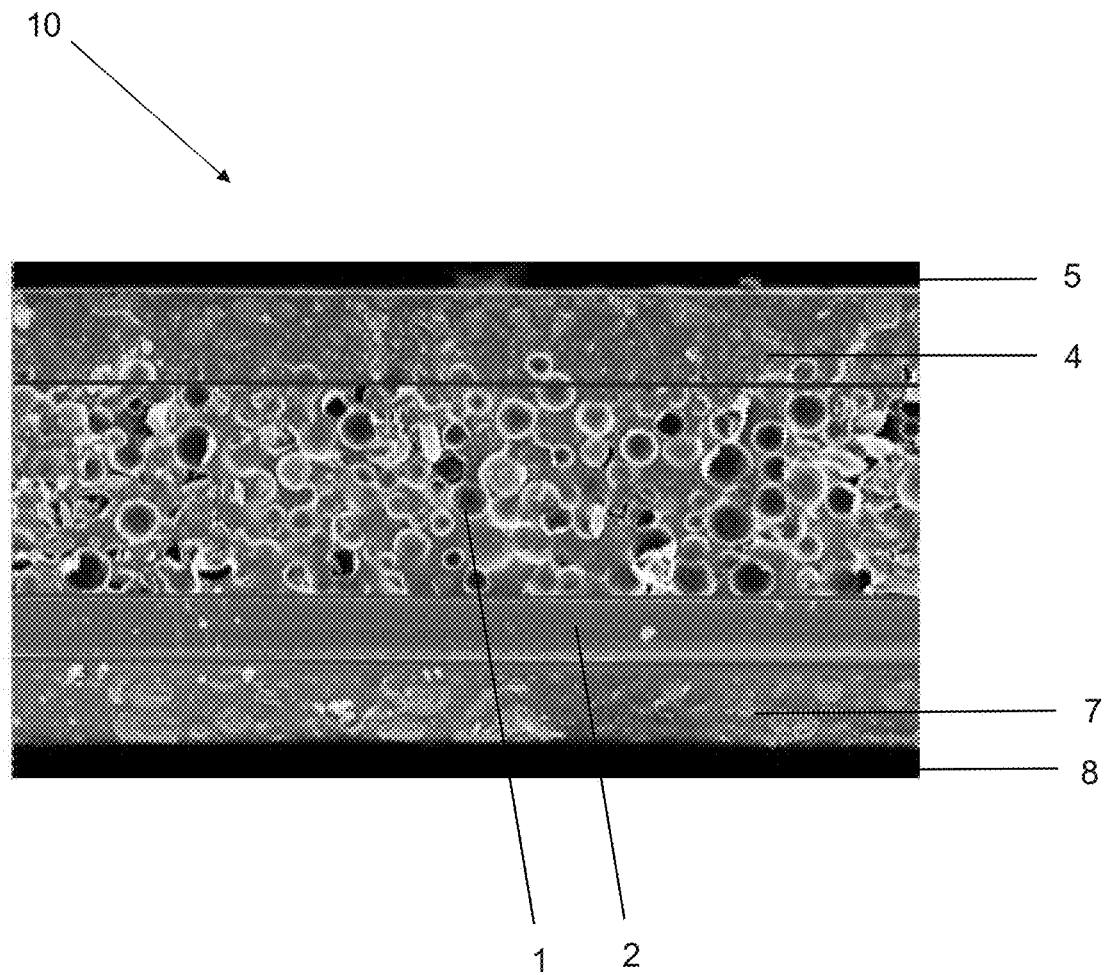

FIG. 3a provides a photograph of the cross section of a four-layer pressure-sensitive adhesive strip through the pressure-sensitive adhesive strip.

Figure 3B:
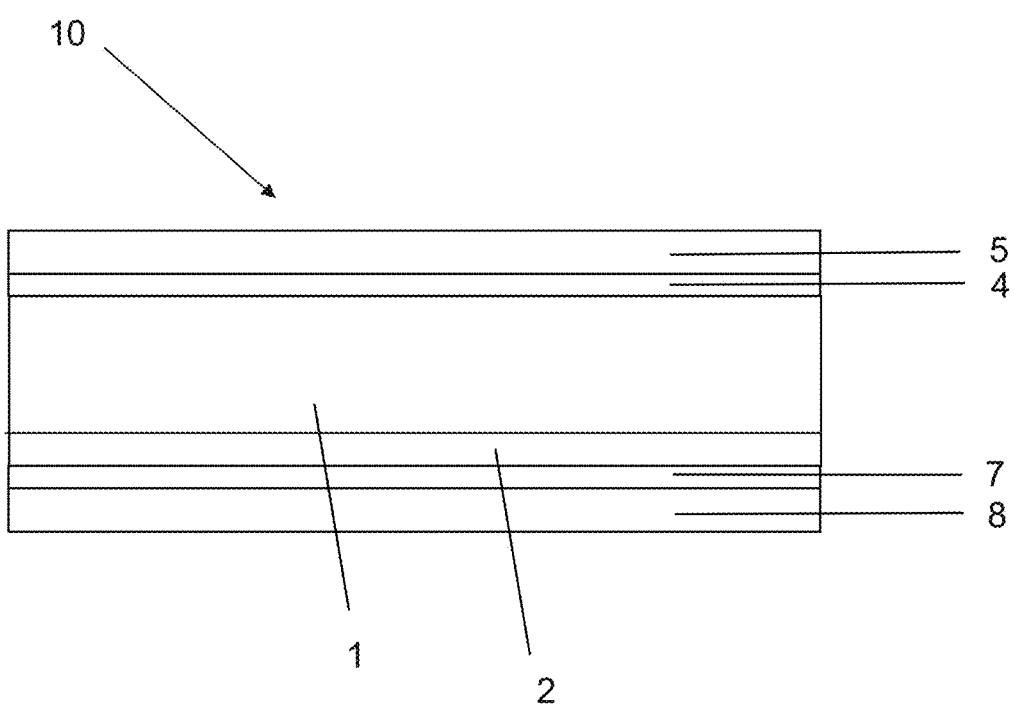

FIG. 3b provides in a drawing, a simplified representation of the construction, in cross-section, of a four-layer pressure-sensitive adhesive strip.

Figure 4:
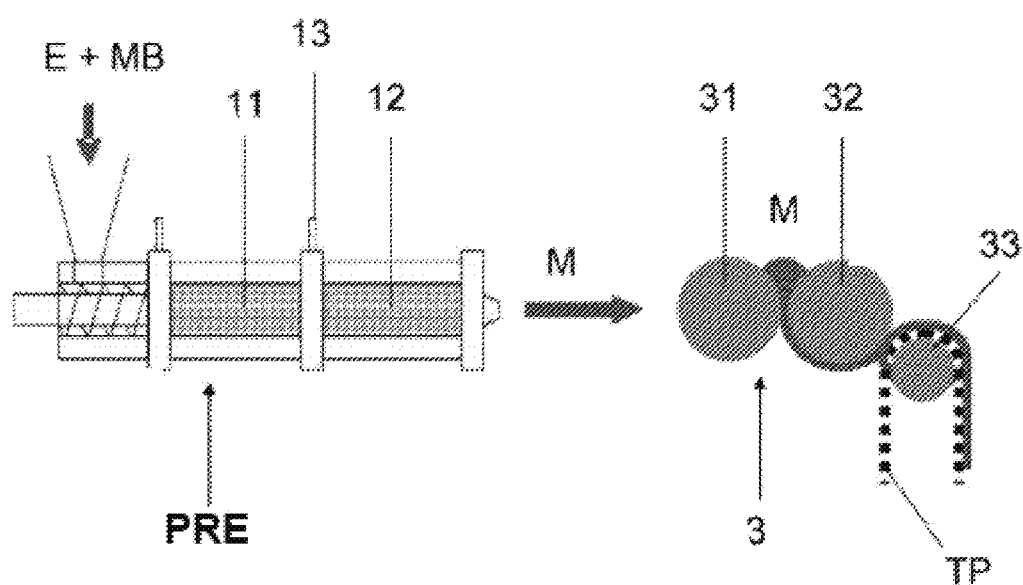

FIG. 4 depicts a process with one mixing unit, wherein the microballoons are added directly to the first mixing unit.

Figure 5:
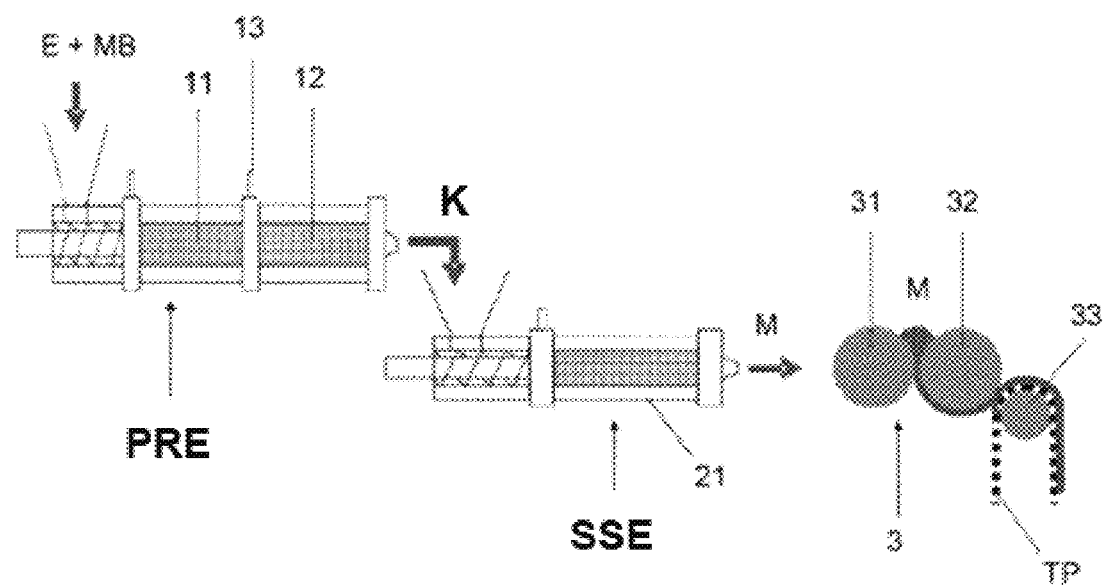

FIG. 5 depicts a process having with two mixing units, wherein the microballoons are added in the first mixing unit.

Figure 6:
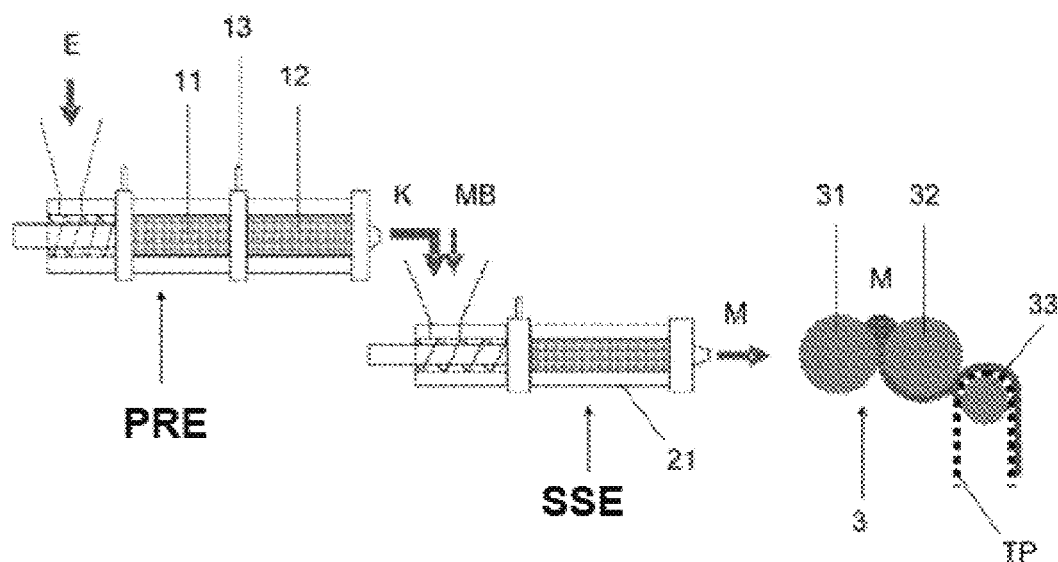

FIG. 6 depicts a process with two mixing units, wherein the microballoons are added only in the second mixing unit.

Figure 7:
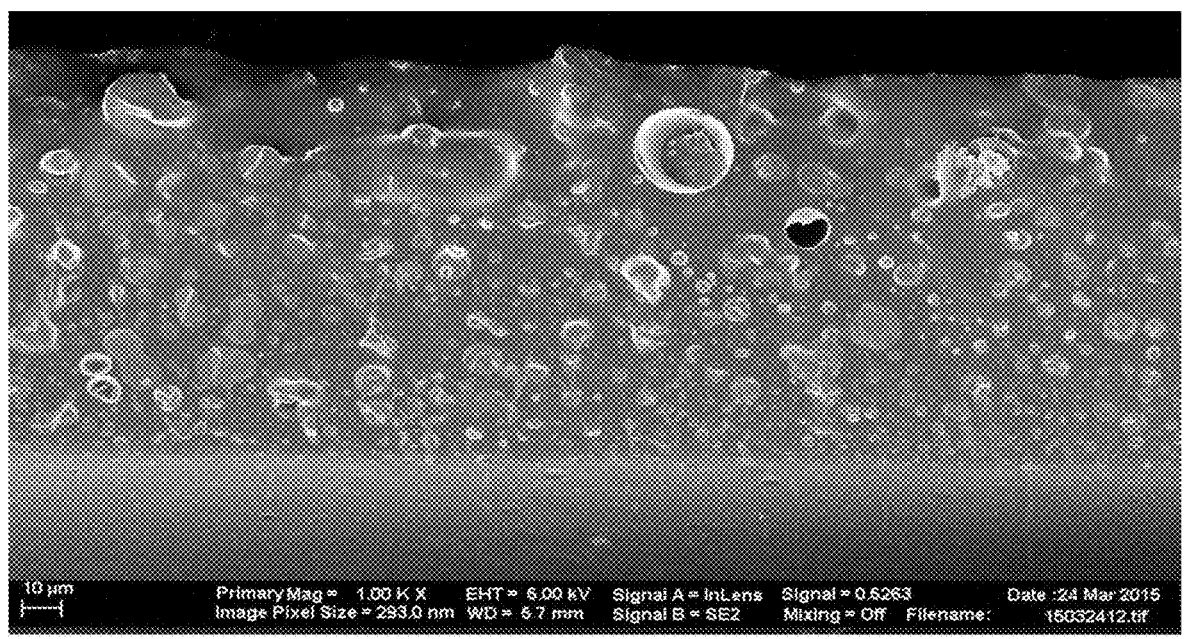

FIG. 7 illustrates in a photograph a gradient in the distribution of the microballoons in a part of an adhesive strip.

Figure 8:
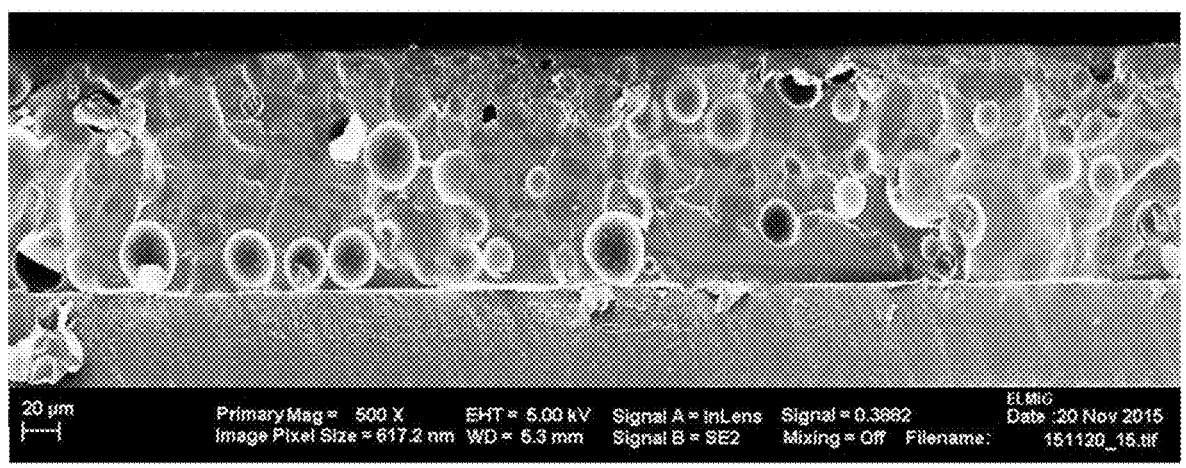

FIG. 8 illustrates in a photograph a different the distribution of the microballoons in a part of an adhesive strip.

Figure 9:
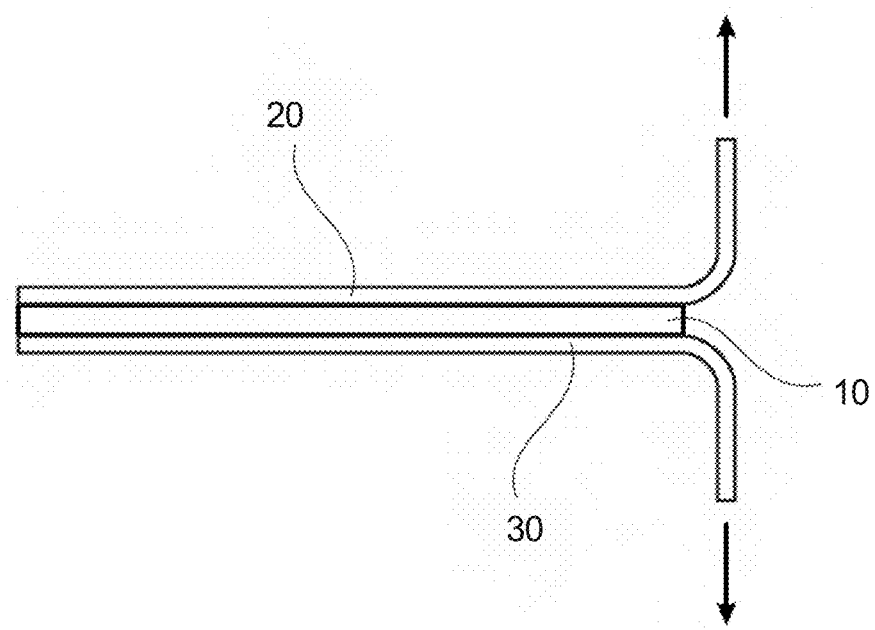

FIG. 9 illustrates, in schematic form, the T-peel test.

It is an object of the invention to find a pressure-sensitive adhesive strip that has particularly high shock resistance both in the x,y plane and in the z plane.

The object is achieved in accordance with the invention by a pressure-sensitive adhesive strip of the generic type as set out in the main claim. The subject matter of the dependent claims comprises advantageous developments of the pressure-sensitive adhesive strip.

Accordingly, the invention relates to a pressure-sensitive adhesive strip composed of at least four layers and especially exactly four layers, comprising a layer A having a top side and a bottom side composed of a foamed adhesive composition based on a self-adhesive acrylate composition,
  a layer B composed of a film carrier, where layer B is arranged on the bottom side of layer A, where at least the main face facing layer A and preferably both main faces of the film carrier have been etched, where the surface of layer A and the surface of layer B are in direct contact with one another,
  a layer C composed of a self-adhesive composition which is arranged on the top side of layer A and is based on a self-adhesive acrylate composition,
  a layer D composed of a self-adhesive composition which is arranged on the opposite side of layer B from layer A and is based on a self-adhesive acrylate composition.

In the present application, the term "film" can also be used as a synonym for the term "film carrier".

The self-adhesive acrylate compositions of layers A, C and D are each a pressure-sensitive adhesive (PSA) composition.

Pressure-sensitive adhesive compositions are especially those polymeric compositions which—if appropriate by suitable additization with further components, for example tackifying resins—are permanently tacky and adhesive at the use temperature (unless defined otherwise, at room temperature) and adhere on contact to a multitude of surfaces, and especially adhere immediately (have so-called "tack" [tackiness or touch-tackiness]). They are capable, even at the use temperature, without activation by solvent or by heat— but typically via the influence of a greater or lesser pressure—of sufficiently wetting a substrate to be bonded such that sufficient interactions for adhesion can form between the composition and the substrate. Influencing parameters that are essential in this respect include the pressure and the contact time. The exceptional properties of the pressure-sensitive adhesive compositions derive, inter alia, especially from their viscoelastic properties. For example, it is possible to produce weakly or strongly adhering adhesive compositions; and also those that can be bonded just once and permanently, such that the bond cannot be parted without destruction of the adhesive and/or the substrates, or those that can readily be parted again and, if appropriate, bonded repeatedly.

Pressure-sensitive adhesive compositions can in principle be produced on the basis of polymers of different chemical nature. The pressure-sensitive adhesive properties are affected by factors including the nature and the ratios of the monomers used in the polymerization of the polymers underlying the pressure-sensitive adhesive composition, the mean molar mass and molar mass distribution thereof, and the nature and amount of the additives to the pressure-sensitive adhesive composition, such as tackifying resins, plasticizers and the like.

To achieve the viscoelastic properties, the monomers on which the polymers underlying the pressure-sensitive adhesive composition are based, and any further components present in the pressure-sensitive adhesive composition, are especially chosen such that the pressure-sensitive adhesive composition has a glass transition temperature (to DIN 53765) below the use temperature (i.e. typically below room temperature).

By means of suitable cohesion-enhancing measures, for example crosslinking reactions (formation of bridge-forming linkages between the macromolecules), it is possible to enlarge and/or to shift the temperature range in which a polymer composition has pressure-sensitive adhesive properties. The range of application of the pressure-sensitive adhesive compositions can thus be optimized via a setting between flowability and cohesion of the composition.

A pressure-sensitive adhesive composition has permanent pressure-sensitive adhesion at room temperature, i.e. has a sufficiently low viscosity and high touch-tackiness, such that it wets the surface of the respective adhesive substrate even at low contact pressure. The bondability of the adhesive composition is based on its adhesive properties, and the redetachability is based on its cohesive properties.

Compositions usable in the context of the invention for layers A, C and D are solvent-based acrylate-based adhesive compositions, on an aqueous basis or else in the form of a hotmelt system, for example an acrylate hotmelt-based composition, where the latter may have a K value of at least 20, especially greater than 30, obtainable by concentration of a solution of such a composition to a system processible as a hotmelt.

The concentration can take place in appropriately equipped tanks or extruders; preference is given to a vented extruder in the case of associated degassing.

An adhesive composition of this kind is set out in DE 43 13 008 A1, the contents of which are hereby referenced and incorporated into this disclosure and invention.

The acrylate hotmelt-based adhesive composition may have been chemically crosslinked.

An adhesive composition which is likewise found to be suitable is a low molecular weight hotmelt acrylate adhesive composition, for example acResin® UV from BASF, and acrylate dispersion pressure-sensitive adhesive compositions as obtainable, for example, under the Acronal® trade name from BASF.

In a further embodiment, the self-adhesive compositions used are copolymers of (meth)acrylic acid and esters thereof having 1 to 25 carbon atoms, maleic acid, fumaric acid and/or itaconic acid and/or esters thereof, substituted (meth) acrylamides, maleic anhydride and other vinyl compounds such as vinyl esters, especially vinyl acetate, vinyl alcohols and/or vinyl ethers.

The residual solvent content should be below 1% by weight.

Another preferred embodiment is a pressure-sensitive adhesive composition comprising a polyacrylate polymer. This is a polymer obtainable by free-radical polymerization of acrylic monomers, which are also understood to mean methacrylic monomers, and optionally further copolymerizable monomers.

According to the invention, it may be a polyacrylate crosslinkable with epoxy groups. Accordingly, monomers or comonomers used may preferably be functional monomers crosslinkable with epoxy groups; monomers employed here especially include monomers having acid groups (particularly carboxylic acid, sulfonic acid or phosphoric acid groups) and/or hydroxyl groups and/or acid anhydride groups and/or epoxy groups and/or amine groups; preference is given to monomers containing carboxylic acid groups. It is especially advantageous when the polyacrylate includes polymerized acrylic acid and/or methacrylic acid.

Further monomers which can be used as comonomers for the polyacrylate are, for example, acrylic and/or methacrylic esters having up to 30 carbon atoms, vinyl esters of carboxylic acids having up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, or mixtures of these monomers.

Preference is given to using a polyacrylate which can be derived from the following monomer composition:
a) acrylic ester and/or methacrylic acid of the following formula:

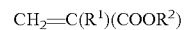

$$CH_2=C(R^1)(COOR^2)$$

where $R^1$=H or CHs and $R^2$=H or linear, branched or cyclic, saturated or unsaturated alkyl radicals having 1 to 30 and especially having 4 to 18 carbon atoms,
b) olefinically unsaturated monomers having functional groups of the type already defined for reactivity with epoxy groups,
c) optionally further acrylates and/or methacrylates and/or olefinically unsaturated monomers copolymerizable with component (a).

Further preferably, for use of the polyacrylate as pressure-sensitive adhesive, the proportions of the corresponding components (a), (b) and (c) are chosen such that the polymerization product especially has a glass transition temperature of not more than 15° C. (determined by DSC (differential scanning calorimetry) according to DIN 53 765 at a heating rate of 10 K/min).

It is very advantageous for production of the pressure-sensitive adhesive compositions that the monomers of component (a) be chosen with a proportion of 45% to 95% by weight, the monomers of component (b) with a proportion of 1% of 15% by weight and the monomers of component (c) with a proportion of 0% to 40% by weight (the figures are based on the monomer mixture for the "base polymer", i.e. without additions of any additives to the finished polymer, such as resins).

The monomers of component (a) are especially plasticizing and/or nonpolar monomers. Preference is given to using, for the monomers (a), acrylic monomers comprising acrylic and methacrylic esters having alkyl groups consisting of 4 to 18 carbon atoms, preferably 4 to 9 carbon atoms. Examples of such monomers are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate and the branched isomers thereof, for example 2-ethylhexyl acrylate or 2-ethylhexyl methacrylate.

Preference is given to using, for component (b), monomers having those functional groups selected from the following enumeration:

hydroxyl, carboxyl, sulfo or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

Monomers mentioned by way of example for component (c) are: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofufuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-m ethoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethyl acrylate, methoxy polyethylene glycol methacrylate 350, methoxy polyethylene glycol methacrylate 500, propylene glycol monomethacrylate, butoxy diethylene glycol methacrylate, ethoxy triethyleneglycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylamino-propylacrylamide, dimethylaminopropylmethacrylamide, N-(1-methyl undecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, for example N, N-dimethylacrylamide, N, N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers such as vinyl methyl ether, ethyl vinyl ether, vinyl isobutyl ether, vinyl esters such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight $M_w$ from 4000 to 13 000 g/mol), poly(methyl methacrylate)-ethyl methacrylate ($M_w$ from 2000 to 8000 g/mol).

Monomers of component (c) may advantageously also be chosen such that they contain functional groups that assist subsequent radiation-chemical crosslinking (for example by electron beams, UV). Suitable copolymerizable photoinitiators are, for example, benzoin acrylate and acrylate-functionalized benzophenone derivatives. Monomers that assist crosslinking by electron bombardment are, for example tetrahydrofurfuryl acrylate, N-tert-butylacrylamide, allyl acrylate, but this enumeration is not conclusive.

A further article of the composition of the pressure-sensitive adhesive is epoxy-based crosslinkers. Substances containing epoxy groups that are used are especially polyfunctional epoxides, i.e. those that have at least two epoxy units per molecule (i.e. are at least bifunctional). These may be either aromatic or aliphatic compounds.

The mixture of acrylates may in turn further preferably have the following composition:
 (a) 90% to 99% by weight of n-butyl acrylate and/or 2-ethylhexyl acrylate
 (b) 1% to 10% by weight of an ethylenically unsaturated monomer having an acid or acid anhydride function Preferably, the monomer (a) is composed of a mixture of 2-ethylhexyl acrylate and n-butyl acrylate, further preferably in equal parts.

Useful monomers (b) advantageously include acrylic acid, methacrylic acid, itaconic acid, maleic acid, fumaric acid and/or maleic anhydride.

Preference is given to acrylic acid or methacrylic acid, optionally the mixture of the two.

For achievement of pressure-sensitive adhesive properties, the adhesive composition should preferably be above its glass transition temperature at the processing temperature in order to have viscoelastic properties. The glass transition temperature of the pressure-sensitive adhesive composition formulation (polymer-tackifier mixture) is therefore preferably below +15° C. (determined by DSC (differential scanning calorimetry) according to DIN 53 765 at a heating rate of 10 K/min).

The glass transition temperature of the acrylate copolymers can be estimated according to the Fox equation from the glass transition temperatures of the copolymers and their relative ratios.

To achieve polymers, for example pressure-sensitive adhesive compositions or heat-sealing compositions, having desired glass transition temperatures, the quantitative composition of the monomer mixture is advantageously chosen so as to give the desired $T_G$ for the polymer according to an equation (G1) in analogy to the Fox equation (cf. T. G. Fox, *Bull. Am. Phys. Soc.* 1956, 1, 123).

$$\frac{1}{T_G} = \sum_n \frac{w_n}{T_{G,n}} \tag{G1}$$

n=serial number over the monomers used,
$w_n$=proportion by mass of the respective monomer n (% by weight) and
$T_{G,n}$=respective glass transition temperature of the homopolymer formed from the respective monomers n in K.

Analogously, equation G1 can also be employed for determination and prediction of the glass transition temperature of polymer mixtures. In that case, if the mixtures are homogeneous mixtures,
n=serial number over the polymers used,
$w_n$=proportion by mass of the respective polymer n (% by weight) and
$T_{G,n}$=respective glass transition temperature of the polymer n in K.

The possible addition of tackifiers inevitably increases the glass transition temperature, by about 5 to 40 K according to the amount added, compatibility and softening temperature. Preference is therefore given to acrylate copolymers having a glass transition temperature of not more than 0° C.

Further preferably, a second, elastomer-based polymer component essentially immiscible with the polyacrylate component, especially a synthetic rubber (called "elastomer component" hereinafter), has been mixed into the adhesive composition.

Preferably, the adhesive composition comprises at least the following two components:
- 60% by weight to 90% by weight, preferably 65% by weight to 80% by weight, of the adhesive composition of a first, polyacrylate-based polymer component,
- 10% by weight to 40% by weight, preferably 15% by weight to 30% by weight, of the adhesive composition of a second, elastomer-based polymer component essentially immiscible with the polyacrylate component, especially a synthetic rubber (called elastomer component hereinafter).

The above percentages by weight are based on the sum total of polyacrylate component and elastomer component as 100% by weight.

According to the invention, the second polymer component is essentially immiscible with the first polymer component, and so the adhesive composition in the adhesive composition layer is present in at least two separate phases. More particularly, one phase forms a matrix and the other phase a multitude of domains arranged within the matrix.

Homogeneous mixtures are substances mixed at the molecular level; homogeneous systems are accordingly monophasic systems. The underlying substances are referred to in a synonymous manner in the context of this document as mutually "homogeneously miscible" and "compatible". Accordingly, two or more components are synonymously "not homogeneously miscible" and "incompatible" when they do not form a homogeneous system after intimate mixing, but at least two phases. Synonymously "partly homogeneously miscible" and "partly compatible" components are regarded as being those which form at least two phases on intimate mixing with one another (for example by shearing, in the melt or in solution and subsequently eliminating the solvent), each of which is rich in one of the components, but one or both of the phases may each include a greater or lesser portion of the other components in a homogeneous mixture.

For its part, the polyacrylate component is preferably a homogeneous phase. The elastomer component may be intrinsically homogeneous or itself have intrinsic polyphasicity, as known from microphase-separating block copolymers. In the present context, polyacrylate and elastomer component are chosen such that—after intimate mixing— they are essentially immiscible at 23° C. (i.e. the customary use temperature for adhesive compositions). "Essentially immiscible" means that the components are either not homogeneously miscible with one another at all, such that none of the phases includes a proportion of the second component in a homogeneous mixture, or that the components are partly compatible with one another only to such a minor degree, i.e. one or both components can homogeneously absorb only such a small proportion of the respective other component, that the partial compatibility is not essential to the invention, i.e. is not detrimental to the teaching of the invention. In that case, the corresponding components are considered in the context of the present invention to be "essentially free" of the respective other component.

The adhesive composition used in accordance with the invention is accordingly present in at least biphasic morphology at least at room temperature (23° C.). Very preferably, the polyacrylate component and the elastomer component are essentially not homogeneously miscible within a temperature range from 0° C. to 50° C., even more preferably from −30° C. to 80° C.

Components in the context of this document are defined as being "essentially immiscible with one another" especially when the formation of at least two stable phases can be detected physically and/or chemically, where one phase is rich in one component—the polyacrylate component— and the second phase is rich in the other component—the elastomer component. An example of a suitable analysis system for a phase separation is scanning electron microscopy. However, phase separation can also be recognized, for example, in that the different phases have two independent glass transition temperatures in dynamic differential calorimetry (DSC). Phase separation exists in accordance with the invention when it can be shown unambiguously by at least one of the analysis methods.

The phase separation may especially be implemented in that there are discrete regions ("domains") that are rich in one component (formed essentially from one of the components and free of the other component) in a continuous matrix rich in the other component (essentially formed from the other component and free of the first component).

The phase separation for the adhesive compositions used in accordance with the invention especially takes place in that the elastomer component is present in dispersed form in a continuous matrix of the polyacrylate component (see FIG. 7). The regions (domains) formed by the elastomer component are preferably in essentially spherical form. The regions (domains) formed by the elastomer component may also depart from spherical form, and especially be distorted, for example elongated and oriented in coating direction. The size of the elastomer domains in their greatest dimension is typically—but not necessarily—between 0.5 μm and 20 μm, especially between 1 μm and 10 μm. Other domain forms are likewise possible, for example in the form of sheets or rods, where these may also depart from ideal structures in terms of their shape and may, for example, be bent or distorted.

The polyacrylate component and the elastomer component each consist of a base polymer component which may be a homopolymer, a copolymer or a mixture of polymers (homopolymers and/or copolymers), and optionally additions (co-components, additives). In simplified form, the base polymer component is referred to hereinafter as "base polymer", but this is not intended to exclude polymer mixtures for the respective base polymer component; correspondingly, "polyacrylate base polymer" is understood to mean the base polymer component of the polyacrylate component and "elastomer base polymer" to mean the base polymer component of the elastomer component of the adhesive composition.

The polyacrylate component and/or the elastomer component may each be in the form of 100% systems, i.e. based exclusively on their respective base polymer component and without further addition of resins, additives or the like. In a further preferred manner, further components, for example resins, have been mixed into one or both of these two components as well as the base polymer component.

In an advantageous execution of the invention, the polyacrylate component and the elastomer component are composed exclusively of their respective base polymer components, and so no further polymeric components are present, and especially no resins are present. In a further development, the overall adhesive composition does not comprise any further constituents apart from the two base polymer components.

One or more crosslinkers for chemical and/or physical crosslinking have especially advantageously been mixed into the polyacrylate-based adhesive composition or the polyacrylate component. However, since radiation-chemical crosslinking of the polyacrylate component is also possible in principle, crosslinkers are not necessarily present.

Crosslinkers are those compounds—especially bi- or polyfunctional compounds, usually of low molecular weight—which can react under the crosslinking conditions chosen with suitable groups—especially functional groups—of the polymers to be crosslinked, thus join two or more polymers or polymer sites to one another (form "bridges") and hence create a network of the polymer or polymers to be crosslinked. This generally results in an increase in cohesion. The degree of crosslinking depends on the number of bridges formed.

Crosslinkers in the present context are in principle all crosslinker systems that are known to the person skilled in the art for the formation particularly of covalent, coordinated or associative binding systems with appropriately modified (meth)acrylate monomers, according to the nature of the polymers chosen and their functional groups. Examples of chemical crosslinking systems are di- or polyfunctional isocyanates or di- or polyfunctional epoxides or di- or polyfunctional hydroxides or di- or polyfunctional amines or di- or polyfunctional acid anhydrides. Combinations of different crosslinkers are likewise conceivable.

Further suitable crosslinkers include chelate formers which, in combination with added functionalities in polymer chains, form complexes that act as crosslinking points.

For effective crosslinking, it is especially advantageous when at least some of the polyacrylates have functional groups with which the respective crosslinkers can react. For this purpose, preference is given to using monomers having functional groups selected from the group comprising: hydroxyl, carboxyl, sulfo or phosphonic acid groups, acid anhydrides, epoxides, amines.

Particularly preferred examples of monomers for polyacrylates are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

It has been found to be particularly advantageous to use, as crosslinker, 0.03 to 0.2 part by weight, especially 0.04 to 0.15 part by weight, of N,N,N',N'-tetrakis(2,3-epoxypropyl)-m-xylene-a,a'-diamine (tetraglycidyl-meta-xylenediamine; CAS 63738-22-7), based on 100 parts by weight of polyacrylate base polymer.

Alternatively or additionally, it may be advantageous to crosslink the adhesive composition by radiation-chemical means. Useful radiation for this purpose includes ultraviolet light (particularly when suitable photoinitiators have been added to the formulation or at least one polymer in the acrylic component contains comonomers having units of photoinitiating functionality) and/or electron beams.

It may be advantageous for radiation-induced crosslinking when some of the monomers used contain functional groups which assist subsequent radiation-chemical crosslinking. Suitable copolymerizable photoinitiators are, for example, benzoin acrylate and acrylate-functionalized benzophenone derivatives. Monomers that assist crosslinking by electron bombardment are, for example, tetrahydrofurfuryl acrylate, N-tert-butylacrylamide and allyl acrylate.

For chemical and/or physical and/or radiation-induced crosslinking, reference is made particularly to the relevant prior art.

For achievement of desired properties of the pressure-sensitive adhesive composition, for example in order to achieve sufficient cohesion of the pressure-sensitive adhesive compositions, the pressure-sensitive adhesive compositions are generally crosslinked, meaning that the individual macromolecules are joined to one another by bridging bonds. Crosslinking can be accomplished in different ways: for instance, there are physical, chemical or thermal methods of crosslinking.

Crosslinking of polymers refers especially to a reaction in which many macromolecules that are linear or branched at first are joined by formation of bridges between the individual macromolecules to give a more or less branched network. The bridges are especially formed by reaction of suitable chemical molecules—called crosslinkers or crosslinker substances—with the macromolecules, for example with particular functional groups of the macromolecules that are particularly attackable by the respective crosslinker molecule. The sites in the crosslinker molecule that attack the macromolecules are generally referred to as "reactive centers". Crosslinker molecules can join two macromolecules to one another in that one and the same crosslinker molecule reacts with two different macromolecules, i.e. especially has at least two reactive centers, or crosslinker molecules may also have more than two reactive centers, such that one single crosslinker molecule may then also join three or more macromolecules to one another. Intramolecular reactions can occur as a side reaction when one and the same crosslinker molecule attacks one and the same macromolecule with at least two of its reactive centers. In the context of effective crosslinking of the polymer, such side reactions are generally undesirable.

It is possible to distinguish between different types of crosslinkers, namely

1.) covalent crosslinkers, namely those that covalently attack the macromolecules to be joined and hence form a covalent chemical bond between the corresponding reactive center and the site of attack—especially the functional group—on the macromolecule. Useful chemical reactions in principle include all conceivable chemical reactions that form covalent bonds.

2.) coordinative crosslinkers, namely those that coordinatively attack the macromolecules to be joined and hence form a coordinate bond between the corresponding reactive center and the site of attack—especially the functional group—on the macromolecule. Useful chemical reactions in principle include all conceivable chemical reactions that form coordinate bonds.

The adhesive composition of layer A, in a preferred embodiment of the invention, is a crosslinkable adhesive composition that especially consists of (a) at least one first base component comprising (a1) as the first polymer component a base polymer component (also referred to hereinafter as base polymer for short) composed of a first homopolymer, a copolymer or a homogeneous mixture of two or more homopolymers, two or more copolymers or one or more homopolymers with one or more copolymers, where at least one of the homopolymers or at least one of the copolymers, especially all the polymers, in the base polymer component have groups that are functional in respect of the crosslinking, (a2) optionally further constituents that are homogeneously miscible with or soluble in the base polymer component, such as resins or additives, monomer residues, short-chain polymerization products (by-products), impurities etc.;

(b) optionally a second component comprising (b1) as a further polymer component polymers that are essentially not homogeneously miscible with the base polymer, especially those having no crosslinkable groups, (b2) optionally further constituents that are essentially not homogeneously miscible with and insoluble in the base polymer, such as particular resins or additives, where component (b2) is especially wholly or partly homogeneously miscible with the further polymer component (b) optionally present;

(c) crosslinkers, namely (c1) at least one covalent crosslinker, (c2) at least one coordinative crosslinker, and (d) optionally solvents or solvent residues.

Useful polymers for the base polymer component (a1) for the present invention especially include those polymers and polymer mixtures which can be crosslinked either by covalent or by coordinative crosslinkers. These are especially polymers having free acid groups available for the crosslinking.

Preferred base polymers that can be used are acrylate copolymers, especially those polymers (copolymers, polymer mixtures) that can be derived to an extent of at least 50% by weight from acrylic monomers. Comonomers chosen for the introduction of the crosslinkable groups are copolymerizable monomers having free acid groups, particular preference being given to using acrylic acid. Monomers containing acid groups, for example acrylic acid, have the property of affecting the pressure-sensitive adhesive properties of the pressure-sensitive adhesive composition. If acrylic acid is used, it is preferably used in a proportion up to a maximum of 12.5% by weight, based on the totality of the monomers of the base polymer component. Depending on the amounts of crosslinker used in each case, the amount of acrylic acid included in the polymer is preferably at least sufficient for there to be enough acid groups to result in essentially complete reaction of the crosslinkers.

Homogeneous mixtures are substances mixed at the molecular level; homogeneous systems are accordingly monophasic systems. The underlying substances are referred to in a synonymous manner in the context of this document as mutually "homogeneously miscible" and "compatible". Accordingly, two or more components are synonymously "not homogeneously miscible" and "incompatible" when they do not form a homogeneous system after intimate mixing, but at least two phases. Synonymously "partly homogeneously miscible" and "partly compatible" components are regarded as being those which form at least two phases on intimate mixing with one another (for example by shearing, in the melt or in solution and subsequently eliminating the solvent), each of which is rich in one of the components, but one or both of the phases may each include a greater or lesser portion of the other components in a homogeneous mixture.

For its part, the polyacrylate component (a) of the advantageous pressure-sensitive adhesive composition of layer A preferably constitutes a homogeneous phase. The elastomer component (b) may be intrinsically homogeneous or itself have intrinsic polyphasicity, as known from microphase-separating block copolymers. In the present context, polyacrylate and elastomer component are chosen such that—after intimate mixing—they are essentially immiscible at 23° C. (i.e. the customary use temperature for adhesive compositions). "Essentially immiscible" means that the components are either not homogeneously miscible with one another at all, such that none of the phases includes a proportion of the second component in a homogeneous mixture, or that the components are partly compatible with one another only to such a minor degree, i.e. one or both components can homogeneously absorb only such a small proportion of the respective other component, that the partial compatibility is not essential to the invention, i.e. is not detrimental to the teaching of the invention. In that case, the corresponding components are considered in the context of the present invention to be "essentially free" of the respective other component.

The advantageous adhesive composition of the invention is accordingly present in at least biphasic morphology at least at room temperature (23° C.). Very preferably, the polyacrylate component and the elastomer component are essentially not homogeneously miscible within a temperature range from 0° C. to 50° C., even more preferably from −30° C. to 80° C.

Components in the context of this document are defined as being "essentially immiscible with one another" especially when the formation of at least two stable phases can be detected physically and/or chemically, where one phase is rich in one component—the polyacrylate component—and the second phase is rich in the other component—the elastomer component. An example of a suitable analysis system for a phase separation is scanning electron microscopy. However, phase separation can also be recognized, for example, in that the different phases have two independent glass transition temperatures in dynamic differential calorimetry (DSC). Phase separation exists in accordance with the invention when it can be shown unambiguously by at least one of the analysis methods.

The phase separation may especially be implemented in that there are discrete regions ("domains") that are rich in one component (formed essentially from one of the components and free of the other component) in a continuous matrix rich in the other component (essentially formed from the other component and free of the first component).

The phase separation for the adhesive compositions used in accordance with the invention especially takes place in that the elastomer component is present in dispersed form in a continuous matrix of the polyacrylate component. The regions (domains) formed by the elastomer component are preferably in essentially spherical form. The regions (domains) formed by the elastomer component may also depart from spherical form, and especially be distorted, for example elongated and oriented in coating direction. The size of the elastomer domains in their greatest dimension is typically—but not necessarily—between 0.5 µm and 20 µm, especially between 1 µm and 10 µm. Other domain forms are likewise possible, for example in the form of sheets or rods, where these may also depart from ideal structures in terms of their shape and may, for example, be bent or distorted.

The polyacrylate component and/or the elastomer component may each be in the form of 100% systems, i.e. based exclusively on their respective polymer component ((a1) or (b1)) and without further addition of resins, additives or the like. In a further preferred manner, further components, for example resins, have been mixed into one or both of these two components as well as the base polymer component.

In an advantageous execution of the invention, the polyacrylate component and the elastomer component are composed exclusively of their respective polymer component ((a1) or (b1)), and so no further polymeric components are present, and especially no resins are present. In a further development, the overall adhesive composition does not comprise any further constituents apart from the two polymer components (a1) or (b1).

The polyacrylate component (a) of the advantageous adhesive composition of the invention especially comprises one or more polyacrylate-based polymers that constitute the base polymer component (a1).

Polyacrylate-based polymers are especially those polymers that can be derived at least predominantly—especially to an extent of more than 60% by weight—from acrylic acid and/or methacrylic acid, and optionally the free acids thereof, as monomers (referred to hereinafter as "acrylic monomers"). Polyacrylates are preferably obtainable by free-radical polymerization. Polyacrylates may optionally contain further units based on further non-acrylic copolymerizable monomers.

The polyacrylates may be homopolymers and/or especially copolymers. The term "copolymer" in the context of this invention encompasses both those copolymers in which the comonomers used in the polymerization are incorporated in a purely random manner and those in which there are gradients in the copolymer composition and/or local enrichments of individual types of comonomer and entire blocks of a monomer in the polymer chains. Alternating comonomer sequences are also conceivable.

The polyacrylates may, for example, be of linear, branched, star-shaped or grafted structure, and they may be homopolymers or copolymers.

Advantageously, the average molar mass (weight-average $M_w$) of at least one of the polyacrylates of the polyacrylate base polymer, and in the case that multiple polyacrylates are present advantageously the predominant proportion by weight of the polyacrylates, especially of all polyacrylates present, is in the range from 250 000 g/mol to 10 000 000 g/mol, preferably in the range from 500 000 g/mol to 5 000 000 g/mol.

In a very preferred procedure, the crosslinkers of component (c) are homogeneously miscible into the base component, optionally after prior dissolution in suitable solvents.

In a preferred execution of the invention, covalent crosslinkers (component (c1)) used for the present invention are glycidylamines. Examples of crosslinkers that are particularly preferred in accordance with the invention include N,N,N',N'-tetrakis(2,3-epoxypropyl)cyclohexane-1,3-dimethylamine and N, N, N',N'-tetrakis(2,3-epoxypropyl)-m-xylene-a,a'-diamine.

It is advantageously also possible to use polyfunctional epoxides, especially epoxycyclohexyl carboxylates, as covalent crosslinkers. Particular mention should be made here of 2,2-bis(hydroxymethyl)propane-1,3-diol or (3,4-epoxycyclohexane)methyl 3,4-epoxycyclohexylcarboxylate.

In addition, polyfunctional aziridines may also be used in accordance with the invention.

One example of these is trimethylolpropane tris(2-methyl-1-aziridinepropionate).

In a further preferred execution of the invention, covalent crosslinkers used are isocyanates, especially polyfunctional isocyanate compounds. The polyfunctional isocyanate compound used may, for example, be tolylene diisocyanate (TDI), tolylene 2,4-diisocyanate dimer, naphthylene 1,5-diisocyanate (NDI), tolylene o-diisocyanate (TODD, diphenylmethane diisocyanate (MDI), triphenylmethane triisocyanate, tris(p-isocyanatophenyl) thiophosphite, polymethylene polyphenyl isocyanate. They may be used alone or in a combination of two or more types thereof.

According to the invention, at least one covalent crosslinker is used, but it is also possible to use two or more covalent crosslinkers, for instance the two aforementioned diamine compounds in combination with one another for example.

Useful COORDINATIVE CROSSLINKERs (component (c2)) for the present invention especially include chelate compounds, especially polyvalent metal chelate compounds. The term "polyvalent metal chelate compound" is understood to mean those compounds in which a polyvalent metal is coordinatively bound to one or more organic compounds. Polyvalent metal atoms used may be Al(III), Zr(IV), Co(II), Cu(I), Cu(II), Fe(II), Fe(III), Ni(II), V(II), V(III), V(IV), V(V), Zn(II), In(III), Ca(II), Mg(II), Mn(II), Y(III), Ce(II), Ce(IV), St(II), Ba(II), Mo(II), Mo(IV), Mo(VI), La(III), Sn(II) Sn(IV), Ti(IV) and the like. Among these, preference is given to Al(III), Zr(IV) and Ti(IV).

Ligands used for the coordinative crosslinkers may in principle be all known ligands. However, the atoms used for the coordinated binding of the organic compound may especially be those atoms that have free electron pairs, for example oxygen atoms, sulfur atoms, nitrogen atoms and the like. The organic compounds used may, for example, be alkyl esters, alcohol compounds, carboxylic acid compounds, ether compounds, ketone compounds and the like. In particular, titanium chelate compounds such as titanium dipropoxide bis(acetylacetonate), titanium dibutoxide bis(octyleneglycolate), titanium dipropoxide bis(ethylacetoacetate), titanium dipropoxide bis(lactate), titanium dipropoxide bis(triethanolaminate), titanium di-n-butoxide bis (triethanolaminate), titanium tri-n-butoxide monostearate, butyl titanate dimer, poly(titanium acetylacetonate) and the like; aluminum chelate compounds such as aluminum diisopropoxide monoethylacetate, aluminum di-n-butoxide monomethylacetoacetate, aluminum di-i-butoxide monomethylacetoacetate, aluminum di-n-butoxide monoethylacetoacetate, aluminum di-sec-butoxide monoethylacetoacetate, aluminum triacetylacetonate, aluminum triethylacetoacetonate, aluminum monoacetylacetonate bis (ethylacetoacetonate) and the like, and zirconium chelate compounds such as zirconium tetraacetylacetonate and the like are listed for illustrative purposes. Among these, preference is given to aluminum triacetylacetonate and aluminum dipropoxide. They may be used alone or in a combination of two or more types thereof.

Covalent crosslinkers are preferably used in a total amount of 0.015 to 0.04 and preferably 0.02 to 0.035 part by weight, based on 100 parts by weight of the base polymer component (a1), very preferably in an amount of 0.03% by weight.

Coordinative crosslinkers are preferably used in an amount of 0.03 to 0.15 and preferably 0.04 to 0.1 part by weight, based on 100 parts by weight of the base polymer component (a1).

Further preferably, covalent crosslinkers and coordinative crosslinkers are used in such a way that the COORDINATIVE CROSSLINKERs are present in a molar excess relative to the covalent crosslinkers. Preference is given to using the crosslinkers within the aforementioned ranges, specifically in such a way that the molar ratio of covalent crosslinkers to coordinative crosslinkers—i.e. the ratio of the molar amount $n_{cov}$ of the covalent crosslinkers used to the molar amount $n_{coord}$ of the COORDINATIVE CROSS- LINKERs used—is in the range from 1:1.3 to 1:4.5; accordingly, $1.3 \leq n_{coord}/n_{cov} \leq 4.5$. A very preferred molar ratio of covalent crosslinkers to COORDINATIVE CROSS-LINKERs is from 1:2 to 1:4.

The elastomer component which is essentially incompatible with the polyacrylate component advantageously comprises one or two or more independently selected synthetic rubbers as base polymer component.

The synthetic rubber used is preferably at least one vinylaromatic block copolymer in the form of a block copolymer having an A-B, A-B-A, $(A-B)_n$, $(A-B)_nX$ or $(A-B-A)_nX$, $A-B-X(A'-B')_n$ structure in which
- the A or A' blocks are independently a polymer formed by polymerization of at least one vinylaromatic, for example styrene or α-methylstyrene;
- the B or B' blocks are independently a polymer formed by polymerization of conjugated dienes having 4 to 18 carbon atoms and/or a polymer formed from an isoprene, butadiene, a farnesene isomer or a mixture of butadiene and isoprene or a mixture of butadiene and styrene, or containing entirely or partially ethylene, propylene, butylene and/or isobutylene, and/or a partly or fully hydrogenated derivative of such a polymer;
- X is the radical of a coupling reagent or initiator and
- n is an integer 2.

More particularly, all synthetic rubbers are block copolymers having a structure as detailed above. The synthetic rubber may thus also comprise mixtures of various block copolymers having a construction as above.

Suitable block copolymers (vinylaromatic block copolymers) thus comprise one or more rubber-like blocks B or B' (soft blocks) and one or more glass-like blocks A or A' (hard blocks). Particular preference is given to a block copolymer having an A-B, A-B-A, $(A-B)_3X$ or $(A-B)_4X$ construction, where the above meanings are applicable to A, B and X. Most preferably, all synthetic rubbers are block copolymers having an A-B, A-B-A, $(A-B)_3X$ or $(A-B)_4X$ construction, where the above meanings are applicable to A, B and X. More particularly, the synthetic rubber is a mixture of block copolymers having an A-B, A-B-A, $(A-B)_3X$ or $(A-B)_4X$ structure, preferably comprising at least diblock copolymers A-B and/or triblock copolymers A-B-A.

Also advantageous is a mixture of diblock and triblock copolymers and $(A-B)_n$ or $(A-B)_nX$ block copolymers with n not less than 3.

In some advantageous embodiments, a block copolymer which is a multi-arm block copolymer is used additionally or exclusively. This is described by the general formula $$Q_m\text{-}Y$$

in which Q represents one arm of the multi-arm block copolymer and m in turn represents the number of arms, where m is an integer of at least 3. Y is the radical of a multifunctional joining reagent which originates, for example, from a coupling reagent or a multifunctional initiator. More particularly, each arm Q independently has the formula A*-B* where A* and B*, in each case independently of the other arms, are chosen in accordance with the above definition for A/A' and B/B', such that each A* represents a vitreous block and B* represents a soft block. It will be appreciated that it is also possible to choose identical A* and/or identical B* for multiple arms Q or all arms Q.

The blocks A, A' and A* are referred to collectively hereinafter as A blocks. The blocks B, B' and B* are correspondingly referred to collectively hereinafter as B blocks.

A blocks are generally vitreous blocks each having a glass transition temperature above room temperature (room temperature in the context of this invention shall be understood to mean 23° C.). In some advantageous embodiments, the glass transition temperature of the vitreous block is at least 40° C., preferably at least 60° C., even more preferably at least 80° C. or very preferably at least 100° C.

The vinylaromatic block copolymer generally also has one or more rubber-like B blocks having a glass transition temperature less than room temperature. In some embodiments, the Tg of the soft block is less than −30° C. or even less than −60° C.

As well as the inventive and particularly preferred monomers mentioned for the B blocks, further advantageous embodiments include a polymerized conjugated diene, a hydrogenated derivative of a polymerized conjugated diene or a combination thereof. In some embodiments, the conjugated dienes comprise 4 to 18 carbon atoms.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer. Examples of further advantageous conjugated dienes for the B blocks additionally include ethylbutadiene, phenylbutadiene, piperylene, pentadiene, hexadiene, ethylhexadiene and dimethylbutadiene, where the polymerized conjugated dienes may be in the form of a homopolymer or of a copolymer.

More preferably, the conjugated dienes as monomers for the soft block B are selected from butadiene and isoprene. For example, the soft block B is a polyisoprene, a polybutadiene or a partly or fully hydrogenated derivative of one of these two polymers, such as polybutylene-butadiene in particular, or a polymer formed from a mixture of butadiene and isoprene. Most preferably, the B block is a polybutadiene.

The proportion of A blocks based on the overall block copolymers preferably averages 10% to 40% by weight, more preferably 15% to 33% by weight.

A preferred polymer for A blocks is polystyrene. Preferred polymers for B blocks are polybutadiene, polyisoprene, polyfarnesene and the partly or fully hydrogenated derivatives thereof, such as polyethylene-butylene, polyethylene-propylene, polyethylene-ethylene-propylene or polybutylene-butadiene or polyisobutylene. Polybutadiene is very preferred.

Mixtures of different block copolymers may be used. Preference is given to using triblock copolymers ABA and/or diblock copolymers AB.

Block copolymers may be linear, radial or star-shaped (multi-arm).

The adhesive compositions used in accordance with the invention may especially be resin-free since the polyacrylate component is frequently itself already pressure-sensitively adhesive, and the pressure-sensitive adhesive character is conserved even when the elastomer component is present. Nevertheless, it may be of interest to further improve the adhesive properties or to optimize them for specific applications; therefore, in an advantageous development of the invention, tackifying resins may be mixed into the adhesive compositions.

The use of tackifiers, also referred to as tackifying resins, for increasing the bonding forces of pressure-sensitive adhesives is known in principle. Preferably, 15 to 100 parts by weight of tackifier (based on the polymers, i.e. acrylates plus any elastomers such as synthetic rubbers) are added to the self-adhesive acrylate composition, usually 20 to 80 parts by weight, further preferably 30 to 50 parts by weight.

A "tackifying resin", in accordance with the general understanding of the person skilled in the art, is understood to mean an oligomeric or polymeric resin that increases autoadhesion (tack, intrinsic tackiness) of the pressure-sensitive adhesive composition compared to the pressure-sensitive adhesive composition that does not contain any tackifying resin but is otherwise identical.

Suitable tackifiers are in principle all known substance classes. Tackifiers are, for example, unhydrogenated or partially, selectively or fully hydrogenated hydrocarbon resins (for example polymers based on unsaturated $C_5$, $C_5/C_9$ or $C_9$ monomers), terpene-phenol resins, polyterpene resins based on raw materials, for example α-, β-pinene and/or δ-limonene, aromatic resins such as coumarone-indene resins or resins based on styrene or α-methylstyrene such as rosin and its conversion products, for example disproportionated, dimerized or esterified rosin, for example reaction products with glycol, glycerol or pentaerythritol, to mention just a few. Preference is given to resins having no readily oxidizable double bonds, such as terpene-phenol resins, aromatic resins and more preferably resins prepared by hydrogenation, for example hydrogenated aromatic resins, hydrogenated polycyclopentadiene resins, hydrogenated rosin derivatives or hydrogenated polyterpene resins.

Preference is given to resins based on terpene-phenols and rosin esters. Preference is likewise given to tackifying resins having a softening point above 80° C. according to ASTM E28-99 (2009). Particular preference is given to resins based on terpene-phenols and rosin esters having a softening point above 90° C. according to ASTM E28-99 (2009).

To further improve the properties, the adhesive composition formulation may additionally have been blended with light stabilizers or primary and/or secondary aging stabilizers.

Aging stabilizers used may be products based on sterically hindered phenols, phosphites, thiosynergists, sterically hindered amines or UV absorbers.

Preference is given to using primary antioxidants, for example Irganox 1010 or Irganox 254, alone or in combination with secondary antioxidants, for example Irgafos TNPP or Irgafos 168.

The aging stabilizers may be used in any combination with one another, and mixtures of primary and secondary antioxidants in combination with light stabilizers, for example Tinuvin 213, show particularly good anti-aging action.

Very particularly advantageous aging stabilizers have been found to be those in which a primary antioxidant is combined with a secondary antioxidant in one molecule. These aging stabilizers are cresol derivatives wherein the aromatic ring is substituted by thioalkyl chains at any two different positions, preferably in ortho and meta position to the OH group, where the sulfur atom may also be bonded via one or more alkyl chains to the aromatic ring of the cresol unit. The number of carbon atoms between the aromatic system and the sulfur atom may be between 1 and 10, preferably between 1 and 4. The number of carbon atoms in the alkyl side chain may be between 1 and 25, preferably between 6 and 16. Particular preference is given here to compounds of the 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol or 4,6-bis(octylthiomethyl)-o-cresol type. Aging stabilizers of this kind are applied, for example, by Ciba Geigy under the Irganox 1726 or Irganox 1520 name.

The amount of the aging stabilizer or aging stabilizer package added should be within a range between 0.1 and 10 parts by weight, preferably within a range between 0.2 to 5 parts by weight, more preferably within a range between 0.5 and 3 parts by weight, based on the polymer content (acrylates plus any elastomers such as synthetic rubbers).

To improve the processing properties, the formulation may also have been blended with customary processing auxiliaries such as rheology additives (thickeners), defoamers, deaerating agents, wetting agents or leveling agents. Suitable concentrations are within the range from 0.1 up to 5 parts by weight based on the polymer content (acrylates plus any elastomers such as synthetic rubbers).

Fillers (reinforcing or non-reinforcing) such as silicon dioxide (spherical, acicular, in platelet form or in irregular form, such as the fumed silicas), calcium carbonate, zinc oxides, titanium dioxides, aluminum oxides or aluminum oxide hydroxides may serve to adjust either processibility or the adhesive properties. Suitable concentrations are within the range from 0.1 up to 20 parts by weight based on the polymer content (acrylates plus any elastomers such as synthetic rubbers).

The self-adhesive acrylate composition that forms layer A and/or C and/or D, in a preferred embodiment of the invention, comprises a polymer mixture of acrylates and synthetic rubbers, where one or more crosslinkers and tackifiers have been mixed into the polymer composition.

According to the invention, layer A has been foamed.

Preferably, the foam is obtained by the introduction and subsequent expansion of microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of microballoon types are commercially available, which differ essentially in terms of their size (diameter 6 to 45 µm in the unexpanded state) and the starting temperatures that they require for expansion (75 to 220° C.). One example of commercially available microballoons is the Expancel® DU products (DU=dry unexpanded) from Akzo Nobel.

Unexpanded microballoon products are also available in the form of an aqueous dispersion having a solids/microballoon content of about 40% to 45% by weight, and additionally also in the form of polymer-bound microballoons (masterbatches), for example in ethylene-vinyl acetate with a microballoon concentration of about 65% by weight. Both the microballoon dispersions and the masterbatches, like the DU products, are suitable for production of a foamed pressure-sensitive adhesive composition of the invention.

A foamed layer A can also be produced with what are called pre-expanded microballoons. In the case of this group, the expansion already takes place prior to mixing into the polymer matrix. Pre-expanded microballoons are commercially available, for example, under the Dualite® name or with the product designation Expancel xxx DE yy (dry expanded) from Akzo Nobel. "xxx" represents the composition of the microballoon blend. "yy" represents the size of the microballoons in the expanded state.

In the processing of already expanded microballoon types, it is possible that the microballoons, because of their low density in the polymer matrix into which they are to be incorporated, will have a tendency to float, i.e. to rise "upward" in the polymer matrix during the processing operation. This leads to inhomogeneous distribution of the microballoons in the layer. In the upper region of the layer (z direction), more microballoons are to be found than in the lower region of the layer, such that a density gradient across the layer thickness is established.

This case is shown in FIG. 7. What can be seen here is a gradient in the distribution of the microballoons. In the upper region of the foam layer there are more and, in particular, further-expanded microballoons in the lower region of the foam layer.

In order to largely or very substantially prevent such a density gradient, preference is given in accordance with the invention to incorporating only a low level of, if any, pre-expanded microballoons into the polymer matrix of layer A. Only after the incorporation into the layer are the microballoons expanded.

In this way, a more homogeneous distribution of the microballoons in the polymer matrix is obtained (see FIG. 8). What can be seen in FIG. 8 is that microballoons expanded to the same extent are present both in the upper region and in the lower region of the foam layer. The degree of expansion of the microballoons is also more balanced overall. Virtually all microballoons have expanded equally.

Preferably, the microballoons are chosen such that the ratio of the density of the polymer matrix to the density of the (non-pre-expanded or only slightly pre-expanded) microballoons to be incorporated into the polymer matrix is between 1 and 1:6, i.e.:

$$\frac{\text{Density of the polymer matrix}}{\text{Density of the microballoons to be incorporated}} = 1 \text{ to } 1.6$$

Expansion then follows immediately after or occurs directly in the course of incorporation. In the case of solvent-containing compositions, the microballoons are preferably expanded only after incorporation, coating, drying (solvent evaporation).

Preference is therefore given in accordance with the invention to using DU products.

Preferably in accordance with the invention, at least 90% of all cavities formed by microballoons in layer A have a maximum diameter of 10 to 200 μm, more preferably of 15 to 200 μm. The "maximum diameter" is understood to mean the maximum extent of a microballoon in any spatial direction.

The diameter is determined using a cryofracture edge in a scanning electron microscope (SEM) at 500-fold modification. For each individual microballoon, the diameter is ascertained by graphical means.

If foaming is effected by means of microballoons, the microballoons can then be supplied to the formulation as a batch, paste or unblended or blended powder. In addition, they may be suspended in solvents.

The proportion of the microballoons in layer A, in a preferred embodiment of the invention, is between greater than 0 parts by weight and 12 parts by weight, especially between 0.25 part by weight and 5 parts by weight, or alternatively between 0.5 and 1.5 parts by weight, based in each case on the overall composition of layer A.

The figures are each based on unexpanded microballoons.

A polymer composition comprising expandable hollow microbeads may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

Also suitable for layer A—selected independently of other additives—are solid polymer beads such as PMMA beads, hollow glass beads, solid glass beads, phenolic resin beads, hollow ceramic beads, solid ceramic beads and/or solid carbon beads ("carbon microballoons").

The absolute density of the foam layer A is preferably 350 to 950 kg/m$^3$, more preferably 450 to 930 kg/m$^3$, especially 500 to 900 kg/m$^3$.

The relative density describes the ratio of the density of the foamed layer A to the density of the unfoamed layer A having an identical formulation. The relative density of layer A is preferably 0.35 to 0.99, more preferably 0.45 to 0.97, especially 0.50 to 0.90.

In a further preferred embodiment, the layer comprises a black pigment such as carbon black. More preferably, the proportion is 0.1 part by weight and 10 parts by weight based on the overall composition of layer A.

Preferably, the thickness of layers C and D is between 10 to 120 μm; further preferably, the thickness of layer A is between 20 and 5000 μm.

Further preferably, layer C and layer D have the same composition, and preferably layer A (apart from the microballoons added in layer A, any other crosslinking system and any dyes additionally added), layer C and layer D have an identical composition.

In a further advantageous embodiment, layer A (again apart from the microballoons and any dyes additionally added) differs from layers C and/or D by the crosslinking system used.

When the layers are virtually or absolutely identical with regard to the polymers used, the tackifying resins and any further additives used, this has the advantage that no migration of constituents from one layer into the other is observed in the case of adjacent layers (in contact with one another).

Materials used for the film are polyesters, especially polyethylene terephthalate, polyamide, polyimide or mono- or biaxially stretched polypropylene. It is likewise possible also to use multilayer laminates or coextrudates.

The film preferably has one layer.

In order to achieve very good results for the roughening, it is advisable to use, as reagent for etching of the film, trichloroacetic acid ($Cl_3C-COOH$) or trichloroacetic acid in combination with inert crystalline compounds, preferably silicon compounds, more preferably $[SiO_2]_x$.

The point of the inert crystalline compounds is to be incorporated into the surface of the PET film, in order in this way to enhance the roughness and surface energy.

The thickness of the film, in a preferred embodiment, is between 5 and 250 μm, preferably between 6 and 120 μm, especially between 12 and 100 μm, very particularly between 23 and 50 μm.

Preferably, the film is made of polyethylene terephthalate and has a thickness between 23 and 50 μm.

A suitable film is available under the Hostaphan® RNK trade name. This film is highly transparent and biaxially oriented and consists of three co-extruded layers.

For production of the film, it may be appropriate to add additives and further components that improve the film-forming properties, reduce the tendency to formation of crystalline segments and/or selectively improve or else, if appropriate, worsen the mechanical properties.

The film carrier used, i.e. the film, is preferably a nonextensible film carrier. In the context of the present application, nonextensible films are considered to be those that fulfill the values which follow for tensile strength and/or elongation at break (values reported in relation to the R1 test method specified later on).

The tensile strength of the film is preferably greater than 100 N/mm$^2$, even more preferably greater than 150 N/mm$^2$, even more preferably greater than 180 N/mm$^2$, especially greater than 200 N/mm$^2$, for example greater than 270 N/mm$^2$, in longitudinal direction, and preferably greater than 100 N/mm$^2$, more preferably greater than 150 N/mm$^2$, more preferably greater than 180 N/mm$^2$, especially greater than 200 N/mm$^2$, for example greater than 270 N/mm$^2$, in transverse direction.

The elongation at break of the film is preferably less than 300%, more preferably less than 200%, especially less than 150%, for example less than 100%, in longitudinal direction, and preferably less than 300%, more preferably less than 200%, especially less than 150%, for example less than 100%, in transverse direction, where these values may be achievable independently of or simultaneously with those for the tensile strength.

The film is crucial in determining the tensile strength and/or elongation at break of the pressure-sensitive adhesive strip. Preferably, the pressure-sensitive adhesive strip has the same values as specified above for tensile strength and elongation at break.

In addition, the outer, exposed faces of the adhesive composition layers can be provided with materials having an anti-adhesive coating on both sides, such as a release paper or a release film, also called liner, specifically as a temporary carrier.

A liner (release paper, release film) is not part of an adhesive tape, but merely an auxiliary for production and/or storage thereof and/or for further processing by die-cutting. Furthermore, a liner, by contrast with an adhesive tape carrier, is not firmly bonded to an adhesive layer.

The production and processing of the pressure-sensitive adhesive compositions can be effected either from solution or from the melt. The application of the pressure-sensitive adhesive compositions can be effected by direct coating or by lamination, especially hot lamination.

Typical supply forms of the pressure-sensitive adhesive strips of the invention are adhesive tape rolls and adhesive strips as obtained, for example, in the form of die-cut parts.

Preferably, all layers are essentially in the shape of a cuboid. Further preferably, all layers are bonded to one another over the full area.

The general expression "adhesive tape", in the context of this invention, encompasses all sheetlike structures such as films or film sections extending in two dimensions, tapes having extended length and limited width, tape sections and the like, and lastly also die-cut parts or labels.

The adhesive tape thus has a longitudinal extent and a lateral extent. The adhesive tape also has a thickness that runs perpendicular to the two extents, the lateral extent and longitudinal extent being several times greater than the thickness. The thickness is very substantially the same, preferably exactly the same, over the entire areal extent of the adhesive tape determined by its length and width.

The adhesive tape is especially in sheet form. A sheet is understood to mean an object, the length of which is several times greater than its width, and the width over the entire length remains roughly and preferably exactly the same.

The adhesive tape can be produced in the form of a roll, i.e. in the form of a rolled-up Archimedean spiral.

The pressure-sensitive adhesive strip preferably has a thickness of 40 μm to 6000 μm, further preferably of 50 to 500 μm, more preferably of 8 to 350 μm, most preferably of 100 to 300 μm.

The invention further relates to a crosslinked pressure-sensitive adhesive composition obtainable by crosslinking a crosslinkable adhesive composition of the invention as described above. The crosslinking preferably takes place in a pressure-sensitive adhesive composition in the form of a layer or of a film.

The crosslinking reaction may especially proceed as follows:

In an advantageous procedure, the two substances are applied to the polymer in solution as a pure substance or predissolved in a suitable solvent, then the polymer is mixed thoroughly with the crosslinkers, coated onto a temporary or permanent carrier and then dried under suitable conditions, under which the crosslinking takes place.

In an optional procedure especially suitable for reactive systems, first of all, one of the crosslinkers is added to the polymer solution in pure or predissolved form. The second crosslinker is not fed in until shortly before the coating, for example via inline metered addition with a downstream active or static mixer and subsequent coating and drying.

The pot life (processing time) of the coordinative crosslinkers can be increased by adding the above-described ligands to the polymer/crosslinker solution. The ligand excess is then removed in the course of drying; only then are the coordinative crosslinkers (fully) reactive.

The drying conditions (temperature and residence time) are very preferably chosen such that not only is the solvent removed but the crosslinking is also complete to a large degree, such that a stable level of crosslinking—especially at relatively high temperatures—is achieved. More particularly, the adhesive composition is fully crosslinked.

Crosslinking of an adhesive composition is understood in accordance with the invention to mean that the maximum shear travel "max" in the micro-shear travel test, under the conditions specified therein, in the case of repeated (for example daily) micro-shear measurement within a period of 48 hours, changes only within the accuracy of the test method (for instance up to a maximum of 5%) when the adhesive composition is stored at room temperature (23° C.) under otherwise standard conditions.

According to the field of use of the adhesive composition, the detection of complete crosslinking can also be conducted for other temperatures (for example 40° C., especially those temperatures that correspond to the respective use temperatures).

In an advantageous manner, the pressure-sensitive adhesive composition can be used for bonding of components for precision-mechanical, optical, electrical and/or electronic devices, for example in the manufacture, repair or decoration thereof or the like. Examples of materials used for bonding here may include plastics, glasses, metals and the like.

The pressure-sensitive adhesive composition is especially also suitable for permanent bonding of flexible materials, especially in the manufacture of flexible displays. Displays of this kind are increasing in importance.

In an advantageous manner, the pressure-sensitive adhesive composition can be used for bonding of windows or lenses in housings of precision-mechanical, optical and/or electronic devices (called "lens mounting"). In this case, at least one of the rigid or flexible substrates is transparent or translucent. The transparent or translucent substrate may, for example, be a window or an optical lens for the purpose of protection of sensitive components arranged beneath—such components may, for example, be liquid-crystal displays (LCDs), light-emitting diodes (LEDs) or organic light-emitting diodes (OLEDs) of displays, but also printed circuits or other sensitive electronic components; this plays a major role, for example, in use for touch-sensitive displays—and/or to bring about optical effects for the function of the device—for example refraction of light, concentration of light, attenuation of light, amplification of light etc.

Very advantageously, the transparent substrate is chosen such that it has a haze value of not more than 50%, preferably of not more than 10%, very preferably of not more than 5% (measured according to ASTM D 1003).

The second substrate is preferably likewise a component of a precision-mechanical, optical and/or electronic device. Conceivable examples here are housings of such devices or holders for windows or lenses as described above.

In a preferred procedure, the transparent or translucent substrate is a substrate made of glass, polymethylmethacrylate and/or polycarbonate.

More particularly, the second substrate may consist of plastics such as acrylonitrile-butadiene-styrene copolymers (ABS), polyamide or polycarbonate, which may especially also be glass fiber-reinforced; or of metals such as aluminum—including anodized (eloxed) aluminum—or magnesium and metal alloys.

Additives, for example dyes, light stabilizers, aging stabilizers, plasticizers or the like, may also have been added to the substrate materials if this is advantageous for the intended end use, and in the case of transparent or translucent materials more particularly to such an extent that it impairs these optical properties only to an acceptable degree, if at all.

According to the invention, the composite of the invention is thus a component of an electronic, optical or precision-mechanical device as cited in the table above.

With reference to the figures and examples described hereinafter, particularly advantageous embodiments of the invention will be elucidated in detail, without any intention to unnecessarily restrict the invention thereby.

The figures show:

FIG. 3*a*, 3*b* a four-layer pressure-sensitive adhesive strip according to the invention.

FIGS. 3*a* and 3*b* show a pressure-sensitive adhesive strip 10 of the invention, composed of four layers 1, 2, 4, 7. FIG. 3*a* shows a photograph of the cross section through the pressure-sensitive adhesive strip 10. FIG. 3*b* is a simplified representation of the construction of the pressure-sensitive adhesive strip 10, likewise as a cross section.

The strip consists of a foamed layer A 1.

On the underside of the foamed layer 1 (layer A), there is a PET film (layer B) 2 that has been etched on both sides.

On the topside of the foamed layer 1 and on the underside of the PET film 2, there are two outer self-adhesive composition layers (layer C and D) 4, 7.

The self-adhesive composition layers (layer C and layer D) 4, 7 have in turn each been lined with a liner 5, 8.

The invention additionally encompasses a process for producing an adhesive composition of the invention comprising expanded microballoons (see FIG. 4), wherein
  the constituents for formation of the adhesive composition, such as polymers, resins or fillers and unexpanded microballoons, are mixed in a first mixing unit and heated to expansion temperature under elevated pressure,
  the microballoons are expanded on exit from the mixing unit,
  the adhesive composition mixture along with the expanded microballoons is formed to a layer in a roll applicator,
  the adhesive composition mixture along with the expanded microballoons is optionally applied to a carrier or release material in sheet form.

The invention likewise encompasses a process for producing an adhesive composition of the invention comprising expanded microballoons (see FIG. 5), wherein
  the constituents for formation of the adhesive composition, such as polymers, resins or fillers, together with non-expanded microballoons, are mixed in a first mixing unit under elevated pressure and heated to a temperature below the expansion temperature of the microballoons,
  the mixed, especially homogeneous adhesive composition from the first mixing unit is transferred into a second unit and heated to expansion temperature under elevated pressure,
  the microballoons are expanded in the second unit or on exit from the second unit,
  the adhesive composition mixture along with the expanded microballoons is formed to a layer in a roll applicator,
  the adhesive composition mixture along with the expanded microballoons is optionally applied to a carrier or release material in sheet form.

The invention likewise relates to a process for producing an adhesive composition of the invention comprising expanded microballoons (see FIG. 6), wherein
  the constituents for formation of the adhesive composition, such as polymers, resins or fillers, are mixed in a first mixing unit,
  the mixed, especially homogeneous adhesive composition from the first mixing unit is transferred into a second mixing unit, into which the non-expanded microballoons are simultaneously introduced,
  the microballoons are expanded in the second mixing unit or on exit from the second mixing unit,
  the adhesive composition mixture along with the expanded microballoons is formed to a layer in a roll applicator,
  the adhesive composition mixture along with the expanded microballoons is optionally applied to a carrier or release material in sheet form.

In a preferred embodiment of the invention, the adhesive composition is shaped in a roll applicator and applied to the carrier material.

There is generally no need to degas compositions foamed with microballoons prior to coating in order to obtain a homogeneous, continuous coating. The expanding microballoons displace the air incorporated into the adhesive composition during compounding. In the case of high throughputs, it is nevertheless advisable to degas the compositions prior to coating in order to obtain a homogeneous feed of composition in the roll gap. The degassing is ideally effected directly upstream of the roll applicator at mixing temperature and with a pressure differential from ambient pressure of at least 200 mbar.

In addition, it is advantageous when
- the first mixing unit is a continuous unit, especially a planetary roll extruder, a twin-screw extruder or a pin extruder,
- the first mixing unit is a batchwise unit, especially a Z kneader or an internal mixer,
- the second mixing unit is a planetary roll extruder, a single-screw or twin-screw extruder or a pin extruder and/or
- the shaping unit in which the adhesive composition along with the expanded microballoons is shaped to give a carrier layer is a calender, a roll applicator or a gap formed by a roll and a fixed doctor.

With the processes of the invention, solvent-free processing of all previously known components of adhesive compositions and those described in the literature, especially self-adhesive components, is possible.

The above-described processes within the concept of the invention in variants of particularly excellent configuration are illustrated hereinafter, without any intention to impose unnecessary restriction through the choice of the figures depicted.

The figures show:

FIG. 4 the process with one mixing unit, wherein the microballoons are added directly in the first mixing unit, FIG. 5 the process with two mixing units, wherein the microballoons are added in the first mixing unit, and FIG. 6 the process with two mixing units, wherein the microballoons are added only in the second mixing unit.

FIG. 4 shows a particularly advantageously configured process for producing a foamed pressure-sensitive self-adhesive tape.

In a continuous mixing unit, for example a planetary roll extruder (PRE), a (self-)adhesive composition is produced.

For this purpose, the reactants "E" that are to form the adhesive composition are introduced into the planetary roll extruder "PRE". At the same time, the unexpanded microballoons "MB" are incorporated homogeneously into the self-adhesive composition under elevated pressure during the compounding process.

The temperatures required for homogeneous production of the self-adhesive composition and for expansion of the microballoons are adjusted with respect to one another such that the microballoons foam in the self-adhesive composition "M" on exit from the PRE as a result of the pressure drop on exit from the die, and in so doing break through the surface of the composition.

With a roll applicator 3 as shaping unit, this foam-like adhesive composition M is calendered and coated onto a carrier material in sheet form, for example release paper "TP"; in some cases, further foaming can still take place in the roll gap. The roll applicator 3 consists of a doctor roll 31 and a coating roll 32. The release paper TP is guided onto the latter via a pick-up roll 33, such that the release paper TP takes up the adhesive composition "K" from the coating roll 32.

At the same time, the expanded microballoons MB are forced back into the polymer matrix of the adhesive composition K, and hence a smooth surface is generated.

Similar elements of FIG. 4 are also present in further figures, and are similarly labelled for consistent reference.

FIG. 5 shows a further particularly advantageously configured further process for producing a foamed pressure-sensitive self-adhesive tape.

The planetary roll extruder PRE has two successive mixing zones 11, 12 in which a central spindle rotates. In addition, there are six planetary spindles per heating zone. Further reactants are added to the injection ring 13, for example plasticizer or liquid resin.

An example of a suitable apparatus is the planetary roll extruder from Entex in Bochum.

Subsequently, the microballoons are incorporated homogeneously under elevated pressure into the self-adhesive composition in a second mixing unit, for example a single-screw extruder "SSE", heated above the expansion temperature and foamed on exit.

For this purpose, the adhesive composition K formed from the reactants E is introduced here into the single-screw extruder SSE; at the same time, the microballoons MB are introduced. The single-screw extruder SSE has a total of four heating zones over its length An example of a suitable apparatus is a single-screw extruder from Kiener.

During the expansion caused by the pressure drop at the nozzle exit of the SSE, the microballoons MB break through the surface of the composition.

With a roll applicator 3, this foam-like adhesive composition M is calendered and coated onto a carrier material in sheet form, for example release paper TP; in some cases, further foaming can still take place in the roll gap. The roll applicator 3 consists of a doctor roll 31 and a coating roll 32. The release paper TP is guided onto the latter via a pick-up roll 33, such that the release paper TP takes up the adhesive composition K from the coating roll 32.

At the same time, the expanded microballoons MB are forced back into the polymer matrix of the adhesive composition K, and hence a smooth surface is generated.

FIG. 6 shows a further particularly advantageously configured process for producing a foamed pressure-sensitive self-adhesive tape.

In a continuous mixing unit, for example a planetary roll extruder PRE, a (self-)adhesive composition is produced.

Here, the reactants E that are to form the adhesive composition are introduced into the planetary roll extruder PRE. The planetary roll extruder PRE has two successive mixing zones 11, 12 in which a central spindle rotates. In addition, there are 6 planetary spindles per heating zone.

Further reactants are added to the injection ring 13, for example plasticizer or liquid resin. An example of a suitable apparatus is the planetary roll extruder from Entex in Bochum.

Subsequently, the microballoons are incorporated homogeneously under elevated pressure into the self-adhesive composition in a second mixing unit, for example a single-screw extruder, heated above the expansion temperature and foamed on exit.

For this purpose, the adhesive composition K formed from the reactants E is introduced here into the single-screw extruder SSE; at the same time, the microballoons MB are introduced. The single-screw extruder SSE has a total of four heating zones over its length 21.

An example of a suitable apparatus is a single-screw extruder from Kiener.

During the expansion caused by the pressure drop at the nozzle exit of SSE, the microballoons MB break through the surface of the composition.

With a roll applicator 3, this foam-like adhesive composition M is calendered and coated onto a carrier material in sheet form, for example release paper TP; in some cases, further foaming can still take place in the roll gap. The roll applicator 3 consists of a doctor roll 31 and a coating roll 32. The release paper TP is guided onto the latter via a pick-up roll 33, such that the release paper TP takes up the adhesive composition K from the coating roll 32.

At the same time, the expanded microballoons MB are forced back into the polymer matrix of the adhesive composition K, and hence a smooth surface is generated.

With falling gap pressure in the roll gap, there is a decrease in the bonding areas of the coated foamed self-adhesive compositions, since the microballoons are then forced back to a lesser degree, as can be inferred from FIG. 4. FIG. 4 shows the bonding areas as a function of the coating process or parameter. The gap pressure required is highly dependent on the composition system used; the higher the viscosity, the greater the gap pressure should be, depending on the layer thickness desired and the coating speed chosen. In practice, a gap pressure of greater than 4 N/mm has been found to be useful; with exceptionally high coating speeds greater than 50 m/min, with low applications of composition (basis weights less than 70 g/m$^2$) and high-viscosity compositions (50 000 Pa*s at 0.1 rad and 110° C.), gap pressures greater than 50 N/mm may even be required.

It has been found to be useful to adjust the temperature of the rolls to the expansion temperature of the microballoons. Ideally, the roll temperature of the first rolls is above the expansion temperature of the microballoons in order to enable further foaming of the microballoons without destroying them. The last roll should have a temperature equal to or below the expansion temperature in order that the microballoon shell can solidify and the smooth surface of the invention forms.

Many units for continuous production and processing of solvent-free polymer systems are known. Usually, screw machines such as single-screw and twin-screw extruders of different processing length and with different equipment are used. Alternatively, continuous kneaders of a wide variety of different designs, for example including combinations of kneaders and screw machines, or else planetary roller extruders, are used for this task.

Planetary roll extruders have been known for some time and were first used in the processing of thermoplastics, for example PVC, where they were used mainly for charging of the downstream units, for example calenders or roll systems. Their advantage of high surface renewal for material and heat exchange, with which the energy introduced via friction can be removed rapidly and effectively, and of short residence time and narrow residence time spectrum, has allowed their field of use to be broadened recently, inter alia, to compounding processes that require a mode of operation with exceptional temperature control.

Planetary roll extruders exist in various designs and sizes according to the manufacturer. According to the desired throughput, the diameters of the roll cylinders are typically between 70 mm and 400 mm.

Planetary roll extruders generally have a filling section and a compounding section. The filling section consists of a conveying screw, into which all solid components are metered continuously. The conveying screw then transfers the material to the compounding section. The region of the filling section with the screw is preferably cooled in order to avoid caking of material on the screw. But there are also embodiments without a screw section, in which the material is applied directly between central and planetary spindles. However, this is of no significance for the efficacy of the process of the invention.

The compounding section consists of a driven central spindle and several planetary spindles that rotate around the central spindle within one or more roll cylinders having internal helical gearing. The speed of the central spindle and hence the peripheral velocity of the planetary spindles can be varied and is thus an important parameter for control of the compounding process.

The materials are circulated between the central and planetary spindles, i.e. between planetary spindles and the helical gearing of the roll section, such that the materials are dispersed under the influence of shear energy and external temperature control to give a homogeneous compound.

The number of planetary spindles that rotate in each roll cylinder can be varied and hence adapted to the demands of the process. The number of spindles affects the free volume within the planetary roll extruder and the residence time of the material in the process, and additionally determines the size of the area for heat and material exchange. The number of planetary spindles affects the compounding outcome via the shear energy introduced. Given a constant roll cylinder diameter, it is possible with a greater number of spindles to achieve better homogenization and dispersion performance, or a greater product throughput.

The maximum number of planetary spindles that can be installed between the central spindle and roll cylinder is dependent on the diameter of the roll cylinder and on the diameter of the planetary spindles used. In the case of use of greater roll diameters as necessary for achievement of throughputs on the production scale, or smaller diameters for the planetary spindles, the roll cylinders can be equipped with a greater number of planetary spindles. Typically, up to seven planetary spindles are used in the case of a roll diameter of D=70 mm, while ten planetary spindles, for example, can be used in the case of a roll diameter of D=200 mm, and 24, for example, in the case of a roll diameter of D=400 mm.

It is proposed in accordance with the invention that the coating of the foamed adhesive compositions be conducted in a solvent-free manner with a multiroll applicator system. These may be applicator systems consisting of at least two rolls with at least one roll gap up to five rolls with three roll gaps.

Also conceivable are coating systems such as calenders (I,F,L calenders), such that the foamed adhesive composition is shaped to the desired thickness as it passes through one or more roll gaps.

It has been found to be particularly advantageous to choose the temperature regime for the individual rolls such that controlled further foaming can take place if appropriate, in such a way that transferring rolls can have a temperature above or equal to the foaming temperature of the microballoon type chosen, whereas receiving rolls should have a temperature below or equal to the foaming temperature, in order to prevent uncontrolled foaming, and where all rolls can be set individually to temperatures of 30 to 220° C.

In order to improve the transfer characteristics of the shaped composition layer from one roll to another, it is also possible to use anti-adhesively finished rolls or patterned rolls. In order to produce a sufficiently precisely shaped adhesive film, the peripheral speeds of the rolls may have differences.

The preferred 4-roll applicator is formed by a metering roll, a doctor roll, which determines the thickness of the layer on the carrier material and is arranged parallel to the metering roll, and a transfer roll disposed beneath the metering roll. At the lay-on roll, which together with the transfer roll forms a second roll gap, the composition and the material in sheet form are brought together.

Depending on the nature of the carrier material in sheet form which is to be coated, coating can be effected in a co-rotational or counter-rotational process.

The shaping system may also be formed by a gap formed between a roll and a fixed doctor. The fixed doctor may be a knife-type doctor or else a stationary (half-)roll.

In an alternative production process, all constituents of the adhesive composition are dissolved in a solvent mixture (benzine/toluene/acetone). The microballoons have been converted to a slurry in benzine and stirred into the dissolved adhesive composition. As soon as the microballoons have been distributed homogeneously in the solution, the adhesive composition can be coated, for example by means of a coating bar onto a conventional PET liner.

In the first step, the coating composition applied is dried in the open air at 100° C. for 15 min. After the drying, the adhesive layer is lined with a second ply of PET liner and foamed in the oven at 150° C. for 5 min, covered between two liners, in order to produce a particularly smooth surface.

The surface thus produced has a roughness $R_a$ of less than 15 µm, more preferably less than 10 µm.

The surface roughness $R_a$ is a unit for the industrial standard for the quality of the final surface processing and constitutes the average height of the roughness, especially the average absolute distance from the center line of the roughness profile within the range of evaluation. This is measured by means of laser triangulation.

The expansion temperature is usually always higher than drying temperature.

The invention is elucidated in detail hereinafter by a few examples.

EXAMPLES

The preparation of the starting polymer is described hereinafter. The polymers examined are prepared conventionally via a free-radical polymerization in solution.

Base Polymer P1

A conventional reactor for free-radical polymerizations was charged with 47.5 kg of 2-ethylhexyl acrylate, 47.5 kg of n-butyl acrylate, 5 kg of acrylic acid and 66 kg of benzine/acetone (70/30). After passing nitrogen gas through for 45 minutes with stirring, the reactor was heated up to 58° C. and 50 g of AIBN were added. Subsequently, the external heating bath was heated to 75° C. and the reaction was conducted constantly at this external temperature. After 1 h, another 50 g of AIBN were added and, after 4 h, the mixture was diluted with 20 kg of benzine/acetone mixture.

After 5.5 and after 7 h, 150 g each time of further bis(4-tert-butylcyclohexyl) peroxydicarbonate initiator were added. After a reaction time of 22 h, the polymerization was stopped and the mixture was cooled to room temperature. The polyacrylate has an average molecular weight of $M_w$=386 000 g/mol, polydispersity PD (Mw/Mn)=7.6.

Example: Pressure-Sensitive Adhesive Composition B1

A mixture comprising 42.425% by weight, based on the dry weight of the polymer, of the base polymer P1, 37.5% by weight of the resin Dertophene T and 20% by weight of Kraton D 1118 is prepared. A solids content of 38% is established by the addition of benzine. The mixture of polymer and resin is stirred until the resin has visibly fully dissolved. Thereafter, 0.075% by weight of the covalent crosslinker Erysis GA 240 (N,N,N',N'-tetrakis(2,3-epoxypropyl)-m-xylene-a,a'-diamine from Emerald Performance Materials, CAS NO. 63738-22-7) is added. The mixture is stirred at room temperature for 15 minutes.

| Kraton 1118 | styrene-butadiene-styrene block copolymer from Kraton Polymers 78% by weight of 3-block, 22% by weight of 2-block; block polystyrene content: 33% by weight (molecular weight $M_w$ of the 3-block content of 150 000 g/mol) |
|---|---|
| Dertophene T | terpene-phenol resin (softening point 110° C.; $M_w$ = 500 to 800 g/mol; D = 1.50), DRT resins, 25359-84-6 |

Example: Pressure-Sensitive Adhesive Composition B2

A mixture comprising 42.34% by weight, based on the dry weight of the polymer, of the base polymer P1, 35.25% by weight of the resin Dertophene T and 17% by weight of Kraton D 1118 is prepared. A solids content of 38% is established by the addition of benzine. The mixture of polymer and resin is stirred until the resin has visibly fully dissolved. Thereafter, 0.035% by weight of the covalent crosslinker Erysis GA 240 (a tetrafunctional epoxy resin based on meta-xylenediamine, CAS NO. 63738-22-7) and 0.075% by weight of Al chelate are added. The mixture is stirred at room temperature for 15 minutes.

During this period, 2.3% by weight of microballoons (Expancel 920 DU20) and 3% by weight of Hostatint are added.

| Al chelate: | Al(III) acetylacetonate (from Sigma Aldrich) |
|---|---|
| Expancel 920 DU20 | microballons |
| Hostatint | black pigment from Clariant |

Example 1

The four-layer pressure-sensitive adhesive strip is produced by the process outlined below:

Layer C (consisting of pressure-sensitive adhesive composition B1) is coated onto a process liner, especially at 75 g/m², and wound up.

Layer D (consisting of pressure-sensitive adhesive composition B1) is coated onto a further liner, especially at 75 g/m², and, after drying, a PET film (layer B) of thickness 23 µm that has been etched on both sides is laminated on.

The tensile strength of the PET film chosen is 185 N/mm² in longitudinal direction and 210 N/mm² in transverse direction. The elongation at break of the film is 146% in longitudinal direction and 92% in transverse direction. The same PET film is used in all examples.

The microballoon-containing layer A (consisting of pressure-sensitive adhesive composition B2) is coated onto a further liner, especially at 86 g/m², and, after drying, laminated together with layer C on the process liner.

The last step includes the foaming of layer A by the action of hot air (155° C.) for about one minute. Downstream of the drying/foaming channel, the process liner on the microballoon-containing layer A is delaminated and layer D is laminated on.

Examples 2 to 4

The following pressure-sensitive adhesive strips are produced by the same method:

Example 2

75 g/m² of layer C
86 g/m² of layer A
23 µm PET film etched on both sides as layer B
75 g/m² of layer D
This results in a pressure-sensitive adhesive strip having a thickness of about 300 µm.

Example 3

30 g/m² of layer C
46 g/m² of layer A
23 µm PET film etched on both sides as layer B
30 g/m² of layer D
This results in a pressure-sensitive adhesive strip having a thickness of about 150 µm.

Figure 1:
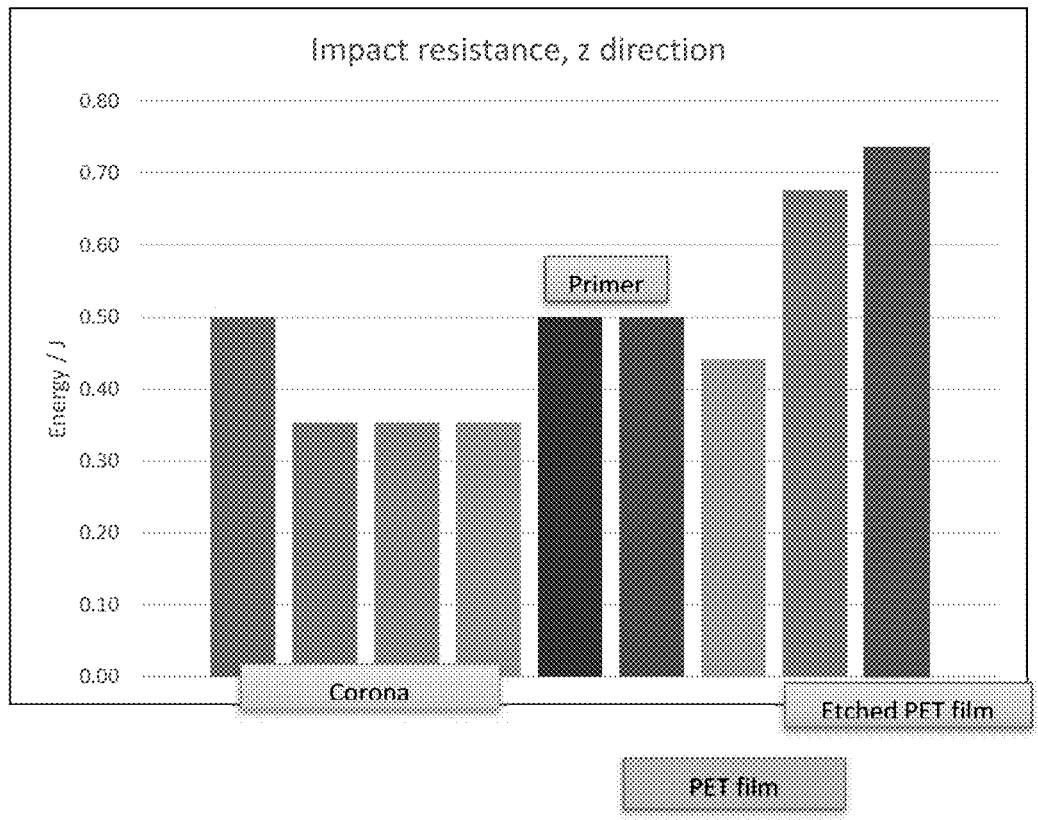
FIG. 1 is a graph listing test results of impact resistance, measured in the 'z direction' of several films.

In FIG. 1, example 2 and a total of seven comparative examples are compared. In this case, the impact resistance measured in z direction is compared.

Example 2 has been measured twice.

The comparative examples basically have the same construction as the pressure-sensitive adhesive strip described in example 2.

However, not an etched PET film but a PET film unetched on both sides is used.

The tensile strength of the films unetched on both sides that are used in the comparative examples is greater than 180 N/mm² in longitudinal direction and greater than 200 N/mm² in transverse direction. The elongation at break of the films is less than 300% in longitudinal direction and less than 300% in transverse direction.

Comparative Examples 1 to 7

75 g/m² of layer C
86 g/m² of layer A
23 µm PET film as layer B
75 g/m² of layer D
This results in each case in a pressure-sensitive adhesive strip having a thickness of about 300 µm.

The person skilled in the art is aware of different ways of enhancing the adhesion between the PET film and the foamed layer.

A corona pretreatment is used in the first four comparative examples (first four bars in FIG. 1), subjecting the surface of the PET film and the surface of the foamed layer that are laminated to one another at a later stage to said corona pretreatment prior to lamination.

During the corona pretreatment, (as well as the usual air) it is possible to use different process gases such as nitrogen that form a protective gas atmosphere or promote the corona pretreatment.

In comparative example 1, the PET film surface and the surface of the foamed layer are corona-pretreated under air.

In comparative example 2, the PET film surface is corona-pretreated under nitrogen and the surface of the foamed layer likewise under nitrogen.

In comparative example 3, the PET film surface is corona-pretreated under nitrogen and the surface of the foamed layer under air.

In comparative example 4, the PET film surface is corona-pretreated under air and the surface of the foamed layer under nitrogen.

Another way of enhancing the adhesion which is known to the person skilled in the art is to use primers between two surfaces.

In comparative examples 5 and 6 (fifth and sixth bars in FIG. 1), both surfaces are treated with two commercial primers based on an aqueous crosslinking acrylate before these surfaces are laminated together.

In comparative example 7 (seventh bar in FIG. 1), an untreated 23 µm-thick PET film (i.e. neither primed nor corona-pretreated) is laminated onto the bonding surface of the foamed layer.

The bonding force tests as shown in tabular form in FIG. 2 show that the use of an etched PET film offers no advantages over the known measures; all results are comparable within the scope of measurement accuracy.

"PA initial steel (foam side)" means immediate bonding force on steel, the pressure-sensitive adhesive strip having been bonded such that the foamed layer is between the substrate and PET film.

"PA initial steel (PET side)" means immediate bonding force on steel, the pressure-sensitive adhesive strip having been bonded such that the PET film is between the substrate and foamed layer.

"PA initial PC (foam side)" means immediate bonding force on polycarbonate, the pressure-sensitive adhesive strip having been bonded such that the foamed layer is between the substrate and PET film.

"PA 3d steel (foam side)" means bonding force on steel after storage for three days, the pressure-sensitive adhesive strip having been bonded such that the foamed layer is between the substrate and PET film.

The other conditions in the bonding force measurement arise correspondingly.

The use of an etched PET film does not show any significant effect either in terms of immediate bonding force or in terms of bonding force after three days on steel or polycarbonate.

In the push-out test, by contrast, and also in terms of impact resistance in z direction and in x,y direction, a significant improvement can be seen in properties resulting from the use of an etched PET film compared to a corona pretreatment, to priming, especially to priming with aqueous, crosslinked acrylate-based primers, or to nontreatment of the PET film surface.

Under shock stress, the use of an etched PET film leads to a distinctly improved pressure-sensitive adhesive strip.

The pressure-sensitive adhesive strips of the invention are very impact-resistant. This can be seen in that they especially fulfill the following conditions (i) and (ii):
  (i) push-out resistance≥120 N, preferably ≥150 N
  (ii) impact resistance, z direction≥0.45 J, preferably ≥0.5 J, very preferably ≥0.6 J

Test Methods

Unless stated otherwise, all measurements were conducted at 23° C. and 50% rel. air humidity.

The mechanical and adhesive data were ascertained as follows:

Elongation at Break and Tensile Strength (R1 Method)

Elongation at break and tensile strength were measured in accordance with DIN 53504 using dumbbell specimens of size S3 at a separation speed of 300 mm per min. The test conditions were 23° C. and 50% rel. air humidity.

Tackifying Resin Softening Temperature

The tackifying resin softening temperature is carried out in accordance with the relevant methodology, which is known as Ring & Ball and is standardized according to ASTM E28.

Gel Permeation Chromatography GPC

The figures for number-average molar mass Mn, weight-average molecular weight $M_w$ and polydispersity PD are based on determination by gel permeation chromatography. The determination is carried out using a clear-filtered 100 μL sample (sample concentration 1 g/L). The eluent used is THF with 0.1% by volume of trifluoroacetic acid. The measurement is made at 25° C. The precolumn used is a column of the PSS-SDV type, 5μ, $10^3$ Å, ID 8.0 mm×50 mm. For the separation, the columns of the PSS-SDV type, 5μ, $10^3$ Å, and also $10^5$ Å and $10^6$ Å, each with ID 8.0 mm×300 mm (columns from Polymer Standards Service; detection by means of Shodex RI71 differential refractometer), are used. The flow rate is 1.0 mL per minute.

Calibration is effected against PMMA standards (polymethylmethacrylate calibration) or, in the case of (synthetic) rubbers, against polystyrene.

DACP

The DACP is the diacetone cloud point and is determined by cooling a heated solution of 5 g of resin, 5 g of xylene and 5 g of diacetone alcohol to the point at which the solution turns cloudy.

Ball Drop Test (Impact Resistance)

A square sample in the shape of a frame was cut out of the adhesive tape to be examined (external dimensions 33 mm×33 mm; border width 3.0 mm; internal dimensions (window cut-out) 27 mm×27 mm). This sample was stuck to an ABS frame (external dimensions 45 mm×45 mm; border width 10 mm; internal dimensions (window cut-out) 25 mm×25 mm; thickness 3 mm). A PMMA window of 35 mm×35 mm was stuck to the other side of the double-sided adhesive tape. The bonding of ABS frame, adhesive tape frame and PMMA window was effected such that the geometric centers and the diagonals were each superimposed on one another (corner-to-corner). The bonding area was 360 mm². The bond was subjected to a pressure of 10 bar for 5 s and stored under conditions of 23° C./50% relative humidity for 24 hours.

Immediately after the storage, the adhesive composite composed of ABS frame, adhesive tape and PMMA sheet was placed by the protruding edges of the ABS frame onto a framework (sample holder) such that the composite was aligned horizontally and the PMMA sheet faced downward in a freely suspended manner. A steel ball of the weight specified in each case was allowed to drop vertically from a height of up to 250 cm (through the window of the ABS frame) onto the sample thus arranged, centered onto the PMMA sheet (test conditions 23° C., 50% relative humidity). Three tests were conducted with each sample, if the PMMA sheet had not become detached beforehand.

The ball drop test is considered to have been passed if the bond did not part in any of the three tests.

In order to be able to compare experiments with different ball weights, the energy was calculated as follows:

$$E = \text{height [m]} * \text{ball weight [kg]} * 9.81 \text{ m/s}^2$$

Push-Out Resistance (z Plane)

By means of the push-out test, it is possible to obtain conclusions as to how high the stability of a bond of a component is in a frame-like body, for example a window in a housing.

A rectangular sample in the shape of a frame was cut out of the adhesive tape to be examined (external dimensions 43 mm×33 mm; border width in each case 2.0 mm; internal dimensions (window cut-out) 39 mm×29 mm, bond area on the top and bottom side 288 mm² in each case). This sample was bonded to a rectangular ABS polymer frame (ABS=acrylonitrile-butadiene-styrene copolymers) (external dimensions 50 mm×40 mm, border width of each of the long borders 8 mm; border width of each of the short borders 10 mm; internal dimensions (window cut-out) 30 mm×24 mm; thickness 3 mm). A rectangular PMMA sheet (PMMA=polymethylmethacrylate) with dimensions of 45 mm×35 mm was bonded to the other side of the sample of the double-sided adhesive tape. The full available bonding area of the adhesive tape was utilized. The bonding of ABS frame, adhesive tape sample and PMMA window was effected such that the geometric centers, the angle bisectors of the acute diagonal angles and the angle bisectors of the obtuse diagonal angles of the rectangles were each superimposed on one another (corner-to-corner, long sides on long sides, short sides on short sides). The bonding area was 288 mm². The bond was subjected to a pressure of 10 bar for 5 s and stored under conditions of 23° C./50% relative humidity for 24 hours.

Immediately after the storage, the adhesive composite composed of ABS frame, adhesive tape and PMMA sheet was placed by the protruding edges of the ABS frame onto a framework (sample holder) such that the composite was aligned horizontally and the PMMA sheet faced downward in a freely suspended manner.

A pressure ram is then moved vertically upward through the window of the ABS frame at a constant speed of 10 mm/min, such that it presses onto the center of the PMMA sheet, and the respective force (determined from the respective pressure and contact area between the ram and sheet) is registered as a function of the time from the first contact of the ram with the PMMA sheet until just before it drops away (test conditions: 23° C., 50% relative humidity). The force acting immediately prior to the failure of the adhesive bond between PMMA sheet and ABS frame (maximum force $F_{max}$ in the force-time diagram in N) is registered as the response of the push-out test.

Bonding Force

The determination of bonding force (according to AFERA 5001) is conducted as follows. The defined bonding substrate used is a polished steel sheet (302 stainless steel according to ASTM A 666; 50 mm×125 mm×1.1 mm; shiny annealed surface; surface roughness 50±25 mm arithmetic average deviation from the baseline) or a polycarbonate. The bondable area element to be examined is cut to a width of 20 mm and a length of about 25 cm, provided with a handling section and, immediately thereafter, pressed onto the bonding substrate chosen in each case five times with a 4 kg steel roll at an advance rate of 10 m/min. Immediately thereafter or after three days had passed, the bondable area element was pulled away from the bonding substrate at an angle of 180° with a tensile tester (from Zwick) at a speed v=300 mm/min, and the force required for the purpose at room temperature was measured. The measured value (in N/cm) is obtained as the average value from three individual measurements.

Static Glass Transition Temperature $T_g$

Glass transition points—referred to synonymously as glass transition temperatures—are reported as the result of measurements by means of differential scanning calorimetry (DSC) according to DIN 53 765; especially sections 7.1 and 8.1, but with uniform heating and cooling rates of 10 K/min in all heating and cooling steps (cf. DIN 53 765; section 7.1; note 1). The sample weight is 20 mg.

Impact Resistance; z Direction

A square sample in the shape of a frame was cut out of the adhesive tape to be examined (external dimensions 33 mm×33 mm; border width 2.0 mm; internal dimensions (window cut-out) 29 mm×29 mm). This sample was stuck to a PC frame (external dimensions 45 mm×45 mm; border width 10 mm; internal dimensions (window cut-out) 25 mm×25 mm; thickness 3 mm). A PC window of 35 mm×35 mm was stuck to the other side of the double-sided adhesive tape. The bonding of PC frame, adhesive tape frame and PC window was effected such that the geometric centers and the diagonals were each superimposed on one another (corner-to-corner). The bonding area was 248 mm². The bond was subjected to a pressure of 248 N for 5 s and stored under conditions of 23° C./50% relative humidity for 24 hours.

Immediately after the storage, the adhesive composite composed of PC frame, adhesive tape and PC window was braced by the protruding edges of the PC frame in a sample holder such that the composite was aligned horizontally and the PC window was beneath the frame. The sample holder was then inserted centrally in the intended receptacle of the "DuPont Impact Tester". The impact head of weight 190 g was used in such a way that the circular impact geometry with a diameter of 20 mm impacted centrally and flush on the window side of the PC window.

A weight having a mass of 150 g guided on two guide rods was allowed to drop vertically from a height of 5 cm onto the composite composed of sample holder, sample and impact head thus arranged (test conditions: 23° C., 50% relative humidity). The height from which the weight dropped was increased in 5 cm steps until the impact energy introduced destroyed the sample as a result of the impact stress and the PC window parted from the PC frame.

In order to be able to compare experiments with different samples, the energy was calculated as follows:

$E$ [J]=height [m]*mass of weight [kg]*9.81 m/s²

Five samples per product were tested, and the mean energy was reported as index for impact resistance.

Transverse Impact Resistance; x,y Plane

A square sample in the shape of a frame was cut out of the adhesive tape to be examined (external dimensions 33 mm×33 mm; border width 2.0 mm; internal dimensions (window cut-out) 29 mm×29 mm). This sample was stuck to a PC frame (external dimensions 45 mm×45 mm; border width 10 mm; internal dimensions (window cut-out) 25 mm×25 mm; thickness 3 mm). A PC window of 35 mm×35 mm was stuck to the other side of the double-sided adhesive tape. The bonding of PC frame, adhesive tape frame and PC window was effected such that the geometric centers and the diagonals were each superimposed on one another (corner-to-corner). The bonding area was 248 mm². The bond was subjected to a pressure of 248 N for 5 s and stored under conditions of 23° C./50% relative humidity for 24 hours.

Immediately after the storage, the adhesive composite composed of PC frame, adhesive tape and PC sheet window was braced by the protruding edges of the PC frame in a sample holder such that the composite was aligned vertically. The sample holder was then inserted centrally the intended receptacle of the "DuPont Impact Tester". The impact head of weight 300 g was used in such a way that the rectangular impact geometry with dimensions of 20 mm×3 mm impacted centrally and flush on the end face of the PC window facing upward.

A weight having a mass of 150 g guided on two guide rods was allowed to drop vertically from a height of 5 cm onto the composite composed of sample holder, sample and impact head thus arranged (test conditions: 23° C., 50% relative humidity). The height from which the weight dropped was increased in 5 cm steps until the impact energy introduced destroyed the sample as a result of the crosswise impact stress and the PC window parted from the PC frame.

In order to be able to compare experiments with different samples, the energy was calculated as follows:

$E$ [J]=height [m]*mass of weight [kg]*9.81 m/s²

Five samples per product were tested, and the mean energy was reported as index for transverse impact resistance.

Micro-Shear Test

This test serves for rapid testing of the shear strength of adhesive tapes under thermal stress.
Test Sample Preparation for Micro-Shear Test:

A piece of adhesive tape cut out of the respective specimen (length about 50 mm, width 10 mm) is bonded to an acetone-cleaned steel test sheet, such that the steel plate projects beyond the adhesive tape to the right and left and that the adhesive tape projects beyond the test plate at the upper edge by 2 mm. The bonding area of the sample is height·width=13 mm·10 mm. A 2 kg steel roll is then rolled over the bonding site six times at a speed of 10 m/min. The adhesive tape is reinforced flush with a stable adhesive strip which serves as contact point for the distance sensor. The sample is suspended vertically by means of the test plate.
Micro-Shear Test:

The specimen to be analyzed is weighted down at the lower end with a weight of 300 g. The test temperature is 40° C., the test duration 30 minutes (15 minutes under stress and 15 minutes without stress). The shear travel after the given test duration at constant temperature is reported as the result in μm, specifically as the maximum value ["max"; maximum shear travel resulting from stress for 15 minutes]; as the minimum value ["min"; shear travel ("residual deflection") after removal of stress 15 min; when stress is removed, there is reverse movement as a result of relaxation]. Likewise reported is the elastic component in % ["elast"; elastic component=(max−min)·100/max].

T-Peel Test

The laminate to be tested (total of 3 strips, about 300×20 mm, or in the defined width) is pulled apart manually at one end of the specimen to form two tabs of length about 100 mm according to the material, with the aid of a suitable solvent, blade or the like, or as specified.

The T-peel test is shown in schematic form in FIG. 9.

One etched PET film 20, 30 each is laminated onto the top side and the bottom side of the pressure-sensitive adhesive strip 100, with the PET films 20, 30 protruding by 100 mm on one side of the pressure-sensitive adhesive strip 10 in order thus to form two tabs. The pressure-sensitive adhesive strip 10 has the dimensions 300×20 mm².

By bending the tabs, a T is formed. One end each is clamped in the upper and lower clamps in a Zwick tensile tester. The machine is started at the defined speed.

At a 180° pulling angle, the clamps are pulled apart at a speed of 50 mm/min and the force per unit test specimen width in N/cm at which the foam layer of the pressure-sensitive adhesive strip 10 splits (called cohesive fracture) is measured.

The measurements are triple determinations and are averaged.

The invention claimed is:

1. A pressure-sensitive adhesive strip composed of at least four layers comprising:
    a layer A having a top side and a bottom side, layer A composed of a foamed adhesive composition based on a self-adhesive acrylate composition containing expanded hollow microballoons;
    a layer B composed of a film carrier, wherein layer B has two main faces, and one main face is in direct contact with the bottom side of layer A and wherein one main face of layer B is etched;
    a layer C based on a self-adhesive acrylate composition is arranged on the top side of layer A,
    a layer that D based on a self-adhesive acrylate composition is arranged on the other main face of layer B.

2. The pressure-sensitive adhesive strip of claim 1, characterized in that:
    the film carrier is non-extensible.

3. The pressure-sensitive adhesive strip of claim 1, characterized in that:
    the film carrier has a tensile strength of greater than 100 N/mm², in a longitudinal direction, and greater than 100 N/mm² in a transverse direction.

4. The pressure-sensitive adhesive strip of claim 1, characterized in that:
    the film carrier has an elongation at break of less than 300% in a longitudinal direction, and of less than 300% in a transverse direction.

5. The pressure-sensitive adhesive strip of claim 1, characterized in that:
    the self-adhesive acrylate based compositions of layers A, C and D are pressure-sensitive self-adhesive compositions.

6. The pressure-sensitive adhesive strip of claim 5, characterized in that:
    the self-adhesive acrylate-based adhesive compositions are formed using a polyacrylate which is derived from the following monomer composition:
    a) acrylic ester and/or methacrylic ester of the following formula:

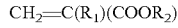

where $R_1$=H or is $CH_3$ and
    $R_2$=H or is a linear, branched or cyclic, alkyl radicals having 1 to 30 carbon atoms, any of the alkyl radicals which may be saturated or unsaturated, b) olefinically unsaturated monomers having functional groups reactive with epoxy groups, and,
    c) optionally, one or more further acrylates and/or methacrylates and/or olefinically unsaturated monomers copolymerizable with component (a).

7. The pressure-sensitive adhesive strip of claim 1, characterized in that:
    the self-adhesive acrylate composition of layer A, C and D is formed using a polyacrylate, and an elastomer-based polymer component essentially immiscible within the polyacrylate is additionally present within the self-adhesive acrylate compositions of layer A, C and D.

8. The pressure-sensitive adhesive strip of claim 7, characterized in that:
    the self-adhesive acrylate compositions of layers A, C and/or D comprises at least
    10% by weight to 40% by weight, of the elastomer-based polymer component.

9. The pressure-sensitive adhesive strip of claim 1, characterized in that:
    the self-adhesive acrylate composition of layer A is a crosslinkable adhesive composition consisting of:
    (a) at least one first base component comprising:
       (a1) as a first polymer component a base polymer component composed of a homopolymer, a copolymer or a homogeneous mixture of two or more homopolymers, two or more copolymers or one or more homopolymers with one or more copolymers,
       where at least one of the homopolymers or at least one of the copolymers in the base polymer component have groups that are functional in respect of a crosslinking,
       (a2) optionally, one or more further constituents that are homogeneously miscible with or soluble in the base polymer component,
    (b) optionally, a second component selected from:
       (b1) a further polymer component which is essentially not homogeneously miscible with the base polymer component,
       (b2) one or more further constituents that are essentially not homogeneously miscible with or are insoluble in the base polymer component where component (b2) is wholly or partly homogeneously miscible with component (b1),
    (c) optionally, one or more crosslinkers, selected from:
       (c1) at least one covalent crosslinker,
       (c2) at least one coordinative crosslinker,
    and
    (d) optionally, solvents or solvent residues.

10. The pressure-sensitive adhesive strip of claim 1, characterized in that:
    15 to 100 parts by weight of tackifier is present in the self-adhesive acrylate compositions of layers A, C and D.

11. The pressure-sensitive adhesive strip of claim 1, characterized in that:
    the self-adhesive acrylate compositions that form layer A and/or C and/or D comprise a polymer mixture of acrylates and synthetic rubbers, with one or more crosslinkers and tackifying resins.

12. The pressure-sensitive adhesive strip of claim 11, characterized in that:
    at least 75% by weight of the tackifying resins are hydrocarbon resins or terpene resins or a mixture thereof.

13. The pressure-sensitive adhesive strip of claim 11, characterized in that:
layer C and layer D have the same composition.

14. The pressure-sensitive adhesive strip of claim 1, characterized in that:
the thickness of layers C and D is between 10 and 120 µm, and the thickness of layer A is between 20 and 5000 µm.

15. The pressure-sensitive adhesive strip of claim 1, characterized in that
the microballoons of layer A are chosen such that a ratio of a density of a polymer matrix of layer A to a density of the non-pre-expanded or only slightly pre-expanded microballoons incorporated into the polymer matrix of layer A, and which are subsequently expanded, is between 1 and 6.

16. The pressure-sensitive adhesive strip according to claim 1,
wherein;
the etched face of the film carrier of layer B is acid etched utilizing trichloroacetic acid in combination with inert crystalline compounds.

17. The pressure-sensitive adhesive strip according to claim 1 wherein;
both main faces of layer B are etched.

18. An accumulator, or electronic device, or a cellphone comprising a pressure-sensitive adhesive strip of claim 1.

\* \* \* \* \*